(12) United States Patent
Murdock et al.

(10) Patent No.: US 11,884,787 B2
(45) Date of Patent: *Jan. 30, 2024

(54) PBI FILMS FORMED WITHOUT USE OF ORGANIC SOLVENTS

(71) Applicant: UNIVERSITY OF SOUTH CAROLINA, Columbia, SC (US)

(72) Inventors: Laura A. Murdock, Columbia, SC (US); Lihui Wang, West Columbia, SC (US); Fei Huang, West Columbia, SC (US); Brian C. Benicewicz, Columbia, SC (US)

(73) Assignee: UNIVERSITY OF SOUTH CAROLINA, Columbia, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/522,160

(22) Filed: Nov. 9, 2021

(65) Prior Publication Data

US 2022/0064391 A1    Mar. 3, 2022

Related U.S. Application Data

(63) Continuation of application No. 16/569,983, filed on Sep. 13, 2019, now Pat. No. 11,180,621.

(Continued)

(51) Int. Cl.
*C08J 5/22* (2006.01)
*B01D 67/00* (2006.01)

(52) U.S. Cl.
CPC ......... *C08J 5/2256* (2013.01); *B01D 67/0011* (2013.01); *B01D 67/0013* (2013.01);
(Continued)

(58) Field of Classification Search
CPC . C08J 5/2256; C08J 2379/04; B01D 67/0011; B01D 67/0013; B01D 67/0093;
(Continued)

(56) References Cited

U.S. PATENT DOCUMENTS

| 4,473,682 | A | 9/1984 | Calundann et al. |
| 4,522,974 | A | 6/1985 | Calundann et al. |

(Continued)

FOREIGN PATENT DOCUMENTS

| CN | 101338038 | 1/2009 |
| CN | 101814611 | 8/2010 |

(Continued)

OTHER PUBLICATIONS

Seel et al. Polyphenylquinoxaline-based proton exchange membranes synthesized via the PPA Process for high temperature fuel cell systems, Journal of Membrane Science, vol. 405-406, 2012, pp. 57-67 (Year: 2012).*

(Continued)

*Primary Examiner* — Michael M. Bernshteyn
(74) *Attorney, Agent, or Firm* — DORITY & MANNING, P.A

(57) ABSTRACT

A novel process for making PBI films starting from gel PBI membranes polymerized and casted in the PPA process wherein acid-imbibed gel PBIs are neutralized in a series of water baths and undergo controlled drying in association with a substrate material, yielding a PBI film without the use of organic solvents.

15 Claims, 19 Drawing Sheets

Related U.S. Application Data

(60) Provisional application No. 62/731,156, filed on Sep. 14, 2018, provisional application No. 62/731,152, filed on Sep. 14, 2018.

(52) U.S. Cl.
CPC ...... B01D 67/0093 (2013.01); *B01D 2323/30* (2013.01); *B01D 2323/40* (2013.01); *B01D 2325/02* (2013.01); *B01D 2325/42* (2013.01); *C08J 2379/04* (2013.01)

(58) Field of Classification Search
CPC ............ B01D 2323/30; B01D 2323/40; B01D 2325/02; B01D 2325/42
USPC .......................................................... 521/27
See application file for complete search history.

(56) References Cited

U.S. PATENT DOCUMENTS

| | | | |
|---|---|---|---|
| 4,746,694 A | 5/1988 | Charbonneau et al. | |
| 4,786,567 A | 11/1988 | Skyllas-Kazacos et al. | |
| 4,898,917 A | 2/1990 | Sansone | |
| 5,114,612 A | 5/1992 | Benicewicz et al. | |
| 5,198,551 A | 5/1993 | Benicewicz et al. | |
| 5,315,011 A | 5/1994 | Benicewicz et al. | |
| 5,382,665 A | 1/1995 | Benicewicz et al. | |
| 5,475,133 A | 12/1995 | Douglas et al. | |
| 5,575,949 A | 11/1996 | Benicewicz et al. | |
| 5,583,169 A | 12/1996 | Wrobleski et al. | |
| 5,658,649 A | 8/1997 | Benicewicz et al. | |
| 5,840,376 A | 11/1998 | Smith et al. | |
| 6,458,968 B2 | 10/2002 | Benicewicz et al. | |
| 6,765,076 B2 | 7/2004 | Benicewicz et al. | |
| 6,987,163 B2 | 1/2006 | Cabasso et al. | |
| 7,148,311 B2 | 12/2006 | Shao et al. | |
| 7,317,066 B2 | 1/2008 | Shao et al. | |
| 7,332,552 B2 | 2/2008 | Li et al. | |
| 7,661,542 B2 | 2/2010 | Baurmeister et al. | |
| 7,696,302 B2 | 4/2010 | Calundann et al. | |
| 7,736,778 B2 | 6/2010 | Uensal et al. | |
| 7,736,779 B2 * | 6/2010 | Uensal | H01M 8/1037 429/492 |
| 7,745,030 B2 * | 6/2010 | Uensal | B01D 71/82 429/492 |
| 7,820,314 B2 * | 10/2010 | Calundann | H01M 8/0289 204/263 |
| 7,837,763 B2 | 11/2010 | Uensal et al. | |
| 8,142,917 B2 | 3/2012 | Uensal et al. | |
| 8,277,983 B2 * | 10/2012 | Calundann | C08G 73/0616 429/400 |
| 8,323,810 B2 | 12/2012 | Calundann et al. | |
| 8,518,743 B2 | 8/2013 | Tao et al. | |
| 8,653,204 B2 | 2/2014 | Hua et al. | |
| 8,716,356 B2 | 5/2014 | Calundann et al. | |
| 8,796,372 B2 | 8/2014 | Nelson et al. | |
| 8,865,796 B2 | 10/2014 | Benicewicz et al. | |
| 9,109,070 B2 | 8/2015 | Benicewicz et al. | |
| 9,130,219 B1 | 9/2015 | Huang et al. | |
| 9,187,643 B2 | 11/2015 | Benicewicz et al. | |
| 9,249,250 B2 | 2/2016 | Benicewicz et al. | |
| 9,359,453 B2 | 6/2016 | Benicewicz et al. | |
| 9,475,922 B2 | 10/2016 | Benicewicz et al. | |
| 9,504,256 B2 | 11/2016 | Wang et al. | |
| 9,598,541 B2 | 3/2017 | Benicewicz et al. | |
| 9,683,055 B2 | 6/2017 | Benicewicz et al. | |
| 9,732,169 B2 | 8/2017 | Wang et al. | |
| 9,773,953 B2 | 9/2017 | Li et al. | |
| 9,806,365 B2 | 10/2017 | Benicewicz et al. | |
| 9,884,935 B2 | 2/2018 | Mohammadkhani et al. | |
| 10,011,674 B2 | 7/2018 | Viswanath et al. | |
| 10,090,550 B2 | 10/2018 | Cho et al. | |
| 10,112,143 B2 | 10/2018 | Kumar et al. | |
| 11,180,621 B2 | 11/2021 | Murdock et al. | |
| 11,302,948 B2 | 4/2022 | Benicewicz et al. | |
| 2004/0028976 A1 | 2/2004 | Cabasso et al. | |
| 2005/0142411 A1 | 6/2005 | Aihara | |
| 2005/0170252 A1 | 8/2005 | Aihara | |
| 2005/0186480 A1 | 8/2005 | Aihara | |
| 2005/0244694 A1 | 11/2005 | Kiefer et al. | |
| 2006/0014065 A1 | 1/2006 | Pawlik et al. | |
| 2007/0218334 A1 | 9/2007 | Bonorand | |
| 2008/0038624 A1 | 2/2008 | Belack et al. | |
| 2008/0241627 A1 | 10/2008 | Kim et al. | |
| 2009/0098437 A1 | 4/2009 | Choi et al. | |
| 2011/0000615 A1 | 1/2011 | Larson et al. | |
| 2011/0003234 A1 | 1/2011 | Martin et al. | |
| 2011/0091789 A1 | 4/2011 | Mofakhami et al. | |
| 2011/0189484 A1 | 8/2011 | Hopkins et al. | |
| 2011/0196051 A1 | 8/2011 | Lee et al. | |
| 2012/0115050 A1 | 5/2012 | Kim et al. | |
| 2012/0196188 A1 | 8/2012 | Zhang et al. | |
| 2012/0201988 A1 | 8/2012 | Hansen et al. | |
| 2012/0231253 A1 | 9/2012 | Klaehn et al. | |
| 2013/0183603 A1 | 7/2013 | Benicewicz et al. | |
| 2014/0377687 A1 | 12/2014 | Miyake et al. | |
| 2015/0295262 A1 | 10/2015 | Kunita et al. | |
| 2016/0315343 A1 | 10/2016 | Kurungot et al. | |
| 2017/0098845 A1 | 4/2017 | Kim et al. | |
| 2018/0123155 A1 | 5/2018 | Benicewicz et al. | |
| 2019/0376189 A1 | 12/2019 | Tarabukin | |
| 2020/0087473 A1 | 3/2020 | Murdock et al. | |
| 2020/0091536 A1 | 3/2020 | Benicewicz et al. | |
| 2020/0091539 A1 | 3/2020 | Benicewicz et al. | |
| 2021/0280883 A1 | 9/2021 | Murdock et al. | |

FOREIGN PATENT DOCUMENTS

| | | |
|---|---|---|
| CN | 103881127 | 6/2014 |
| CN | 106750441 | 5/2017 |
| CN | 106750442 | 5/2017 |
| CN | 106784947 | 5/2017 |
| CN | 110791774 | 2/2020 |
| JP | 2004204160 A | 7/2004 |
| JP | 2007217587 A | 8/2006 |
| JP | 2014500567 A | 1/2014 |
| JP | 2016207608 | 12/2016 |
| KR | 20120061156 | 6/2012 |
| WO | WO 2005/014474 | 2/2005 |
| WO | WO 2008/060658 | 5/2008 |
| WO | WO 2013/108111 | 7/2013 |
| WO | WO 2014/111792 | 7/2014 |
| WO | WO 2014/111793 | 7/2014 |
| WO | WO 2019/200187 | 10/2019 |

OTHER PUBLICATIONS

Xiao et al. "High-Temperature Polybenzimidazole Fuel Cell Membranes via Sol-Gel Process", Chemistry of Materials, 2005, 17(21), 5328-5333 (Year: 2005).*

EPO. "Extended European Search Report" *Euro. Pat. Ofc.* 19860547 (dated Jun. 22, 2022) pp. 1-11.

EPO. "Extended European Search Report" *Euro. Pat. Ofc.* 19860913 (dated Jun. 23, 2022) pp. 1-8.

Weidner, J.W. "Electrolyzer performance for producing hydrogen via a solar-driven hybrid-sulfur process" *J. Appl. Electrochem.* 46 (2016) pp. 829-839.

Uregen, et al. "Development of polybenzimidazole/graphene oxide composite membranes for high temperature PEM fuel cells." International Journal of Hydrogen Energy 42.4 (2017): 2636-2647. (Year: 2017).

Carmo et al. "A comprehensive review on PEM water electrolysis" *Int'l J. Hydrogen Energ.* 38 (2013) pp. 4901-4934.

Chan et al. "Electrochemically Enabled Sustainability: Devices, Materials and Mechanisms for Energy Conversion" *CRC Press* (2014) p. 420.

Chang et al. "One-Step Cationic Grafting of 4-Hydroxy-TEMPO and its Application in a Hybrid Redox Flow Battery with a Cross-linked PBI Membrane" *ChemSusChem* 10 (2017) pp. 3193-3197. (Abstract only).

(56) References Cited

OTHER PUBLICATIONS

Chen et al. "High Temperature Creep Behavior of Phosphoric Acid-Polybenzimidazole Gel Membranes" *J. Polym. Sci. Pt. B* 53 (2015) pp. 1527-1538.
Fishel et al. "Solution Polymerization of Polybenzimidazole" *J. Polym. Sci. Pt. A* 54 (2016) pp. 1795-1802.
Fishel et al. "Ch. 24—Electrochemical Hydrogen Pumping" *High Temp. Polym. Electrolyte Membr. Fuel Cells* Springer Verlag (2015) pp. 527-540.
Fishel et al. "Ch. 10—PBI Membranes Via the PPA Process" *High Temp. Polym. Electrolyte Membr. Fuel Cells* Springer Verlag (2015) pp. 217-238.
Garrick et al. "Characterizing Voltage Losses in an $SO_2$ Depolarized Electrolyzer Using Sulfonated Polybenzimidazole Membranes" *J. Electrochem. Soc.* 164 (2017) pp. F1591-F1595.
Garrick et al. "Polybenzimidazole Membranes for Hydrogen Production in the Hybrid Sulfur Electrolyzer" *ECS Transactions* 66 (2015) pp. 31-40.
Gokhale et al. "Implementing PGM-free electrocatalysts in high-temperature polymer electrolyte membrane fuel cells" *Electrochem. Comm.* 93 (2018) pp. 91-94.
Gulledge et al. "Investigation of Sequence Isomer Effects in AB-Polybenzimidazole Polymers" *J. Polym. Sci. Part A: Polym. Chem.* 52 (2014) pp. 619-628.
Gulledge et al. "A New Sequence Isomer of AB-Polybenzimidazole for High-Temperature PEM Fuel Cells" *J. Polym. Sci. Pt. A* 50 (2012) pp. 303-313.
Jang et al. "Highly proton conductive, dense polybenzimidazole membranes with low permeability to vanadium and enhanced $H_2S_O4$ absorption capability for use in vanadium redox flow batteries" *J. Mater. Chem. A* 4 (2016) pp. 14342-14355.
Jayakody et al. "NMR Studies of Mass Transport in High-Acid-Content Fuel Cell Membranes Based on Phosphoric Acid and Polybenzimidazole" *J. Electrochem. Soc.* 154 (2007) pp. B242-B246.
Li et al. "Synthesis and Characterization of a New Fluorine-Containing Polybenzimidazole (PBI) for Proton-Conducting Membranes in Fuel Cells" *Fuel Cells* 13 (2013) pp. 832-842.
Li et al. "Synthesis and properties of phenylindane-containing polybenzimidazole (PBI) for high-temperature polymer electrolyte membrane fuel cells (PEMFCs)" *J. Power Sources* 243 (2013) pp. 796-804.
Li et al. "High temperature proton exchange membranes based on polybenzimidazoles for fuel cells" *Prog. Polym. Sci.* 34 (2009) pp. 449-477.
Luo et al. "Porous poly(benzimidazole) membrane for all vanadium redox flow battery" *J. Power Sources* 312 (2016) pp. 45-54. (Abstract only).
Mader et al. "Synthesis and Properties of Random Copolymers of Functionalised Polybenzimidazoles for High Temperature Fuel Cells" *Fuel Cells* 11 (2011) pp. 212-221.
Mader et al. "Synthesis and Properties of Segmented Block Copolymers of Functionalised Polybenzimidazoles for High-Temperature PEM Fuel Cells" *Fuel Cells* 11 (2011) pp. 222-237.
Mader et al. "Sulfonated Polybenzimidazoles for High Temperature PEM Fuel Cells" *Macromolecules* 43 (2010) pp. 6706-6715.
Mader et al. "Polybenzimidazole/Acid Complexes as High-Temperature Membranes" *Adv. Polym. Sci.* 216 (2008) pp. 63-124.
Molleo et al. "High Polymer Content 2,5-Pyridine-Polybenzimidazole Copolymer Membranes with Improved Compressive Properties" *Fuel Cells* 15 (2015) pp. 150-159.
Molleo et al. "High Polymer Content 3,5-Pyridine-Polybenzimidazole Copolymer Membranes with Improved Compressive Properties" *Fuel Cells* 14 (2014) pp. 16-25.
Molleo et al. "Ch. 13—Polybenzimidazole Fuel Cell Technology" *Encyclopedia of Sustainability Science and Technology* Springer (2012) pp. 391-431.
Neutzler et al. "Performance of vapor-fed direct dimethyl ether fuel cell utilizing high temperature polybenzimidazole polymer electrolyte membrane" *J. Power Sources* 216 (2012) pp. 471-474.

Noh et al. "Vanadium Redox Flow Batteries Using meta-Polybenzimidazole-Based Membranes of Different Thicknesses" *ACS Appl. Mater. Interf.* 9 (2017) pp. 36799-36809.
Parasuraman et al. "Review of material research and development for vanadium redox flow battery applications" *Electrochimica Acta* 101 (2013) pp. 27-40.
Peng et al. "Thin skinned asymmetric polybenzimidazole membranes with readily tunable morphologies for high-performance vanadium flow batteries" *RSC Advances* 7 (2017) pp. 1852-1862.
Peng et al. "A $H_3PO_4$ preswelling strategy to enhance the proton conductivity of a $H_2SO_4$-doped polybenzimidazole membrane for vanadium flow batteries" *RSC Advances* 6 (2016) pp. 23479-23488.
Perry et al. "Advanced Redox-Flow Batteries: A Perspective" *J. Electrochem. Soc.* 163 (2016) pp. A5064-A5067.
Perry et al. "A Comparative Study of Phosphoric Acid-Doped m-PBI Membranes" *J. Polym. Sci. Part B: Polym. Phys.* 52 (2014) pp. 26-35.
Prifti et al. "Membranes for Redox Flow Battery Applications" *Membranes* 2 (2012) pp. 275-306.
Qian et al. "Synthesis and Characterization of High Molecular Weight Hexafluoroisopropylidene-Containing Polybenzimidazole for High-Temperature Polymer Electrolyte Membrane Fuel Cells" *J. Polym. Sci. Part A: Polym. Chem.* 47 (2009) pp. 4064-4073.
Rastler, D. "Electrical energy storage technology options" *Electr. Power Res. Inst.* 1020676 (2010) pp. 1-161.
Razali et al. "Exploring and Exploiting the Effect of Solvent Treatment in Membrane Separations" *ACS Appl. Mater. Interf.* 9 (2017) pp. 11279-11289.
Schönberger et al. "Polybenzimidazole-Based Block Copolymers: From Monomers to Membrane Electrode Assemblies for High Temperature Polymer Electrolyte Membrane Fuel Cells" *J. Polym. Sci., Pt. A* 55 (2017) pp. 1831-1843.
Seel et al. "Polyphenylquinoxaline-based proton exchange membranes synthesized via the PPA Process for high temperature fuel cell systems" *J. Membr. Sci.* 405-406 (2012) pp. 57-67.
Seel et al. "Ch. 19—High-temperature polybenzimidazole-based membranes" *Handbook of Fuel Cells. Part II: Conductive membranes for low-temperature fuel cells* John Wiley & Sons, Ltd. (2009) pp. 1-13.
Shogbon et al. "Determination of the Molecular Parameters and Studies of the Chain Conformation of Polybenzimidazole in DMAc/LiCl" *Macromolecules* 39 (2006) pp. 9409-9418.
Singh et al. "Polybenzimidazole based random copolymers containing hexafluoroisopropylidene functional groups for gas separations at elevated temperatures" *Polymer* 119 (2017) pp. 134-141.
Skyllas-Kazacos et al. "Vanadium Electrolyte Studies for the Vanadium Redox Battery—A Review" *ChemSusChem* 9 (2016) pp. 1521-1543.
Suarez et al. "Multinuclear NMR Study of the Effect of Acid Concentration on Ion Transport in Phosphoric Acid Doped Poly(benzimidazole) Membranes" *J. Phys. Chem. B* 116 (2012) pp. 12545-12551.
Tang et al. "Phosphoric acid-imbibed three-dimensional polyacrylamide/poly(vinyl alcohol) hydrogel as a new class of high-temperature proton exchange membrane" *J. Power Sources* 229 (2013) pp. 36-41.
Valtcheva et al. "Crosslinked polybenzimidazole membranes for organic solvent nanofiltration (OSN): Analysis of crosslinking reaction mechanism and effects of reaction parameters" *J. Membr. Sci.* 493 (2015) pp. 568-579.
Wang et al. "Sulfonated PBI Gel Membranes for Redox Flow Batteries" *J. Electrochem. Soc.* 166 (2019) pp. A1449-A1455.
Wang et al. "Ch. 19—Polybenzimidazoles" *Handbook of Thermoplastics* CRC Press (2015) pp. 617-667.
Xiao et al. "High-Temperature Polybenzimidazole Fuel Cell Membranes via a Sol-Gel Process" *Chem. Mater.* 17 (2005) pp. 5328-5333.
Xiao et al. "Synthesis and Characterization of Pyridine-Based Polybenzimidazoles for High Temperature Polymer Electrolyte Membrane Fuel Cell Applications" *Fuel Cells* 5 (2005) pp. 287-295.
Xie et al. "Processing and Pretreatment Effects on Vanadium Transport in Nafion Membranes" *J. Electrochem. Soc.* 163 (2016) pp. A5084-A5089.

(56) References Cited

OTHER PUBLICATIONS

Yang et al. "Fabrication of crosslinked polybenzimidazole membranes by trifunctional crosslinkers for high temperature proton exchange membrane fuel cells" *Intl. J. Hydrogen Energy* 43 (2018) pp. 3299-3307.

Yu et al. "Synthesis of Poly (2,2'-(1,4-phenylene) 5,5'-bibenzimidazole) (para-PBI) and Phosphoric Acid Doped Membrane for Fuel Cells" *Fuel Cells* 9 (2009) pp. 318-324.

Yu et al. "Synthesis and Properties of Functionalized Polybenzimidazoles for High-Temperature PEMFCs" *Macromolecules* 42 (2009) pp. 8640-8648.

Yuan et al. "Advanced porous membranes with ultra-high selectivity and stability for vanadium flow batteries" *Energy Environ. Sci.* 9 (2016) pp. 269-272.

Zhang et al. "Progress and prospects of next-generation redox flow batteries" *Energy Stor. Mater.* 15 (2018) pp. 324-350.

Zhou et al. "The use of polybenzimidazole membranes in vanadium redox flow batteries leading to increased coulombic efficiency and cycling performance" *Electrochimica Acta* 153 (2015) pp. 492-498.

ISA. "International Search Report and Written Opinion" PCT/US2019/050993 (dated Feb. 21, 2020) pp. 1-10.

ISA. "International Search Report and Written Opinion" PCT/US2019/051028 (dated Jan. 27, 2020) pp. 1-11.

ISA. "International Search Report and Written Opinion" PCT/US2019/051036 (dated Jan. 29, 2020) pp. 1-11.

ISA. "International Search Report and Written Opinion" PCT/US2021/048782 (dated Dec. 23, 2021) pp. 1-14.

\* cited by examiner

| VRFB Oxidative Stability Test | | | | | |
|---|---|---|---|---|---|
| Membrane ID | Date of Soak | Titration Date 02/16/17 | | Titration Date 06/30/17 | |
| | | V4 | V5 | V4 | V5 |
| V5 Control | 05/25/26 | Non-detectable | 1.570 | Non-detectable | 1.583 |
| PBI Membrane | 05/25/26 | Non-detectable | 1.551 | Non-detectable | 1.576 |
FIG. 3
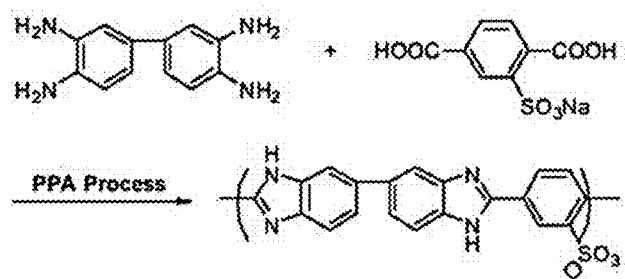
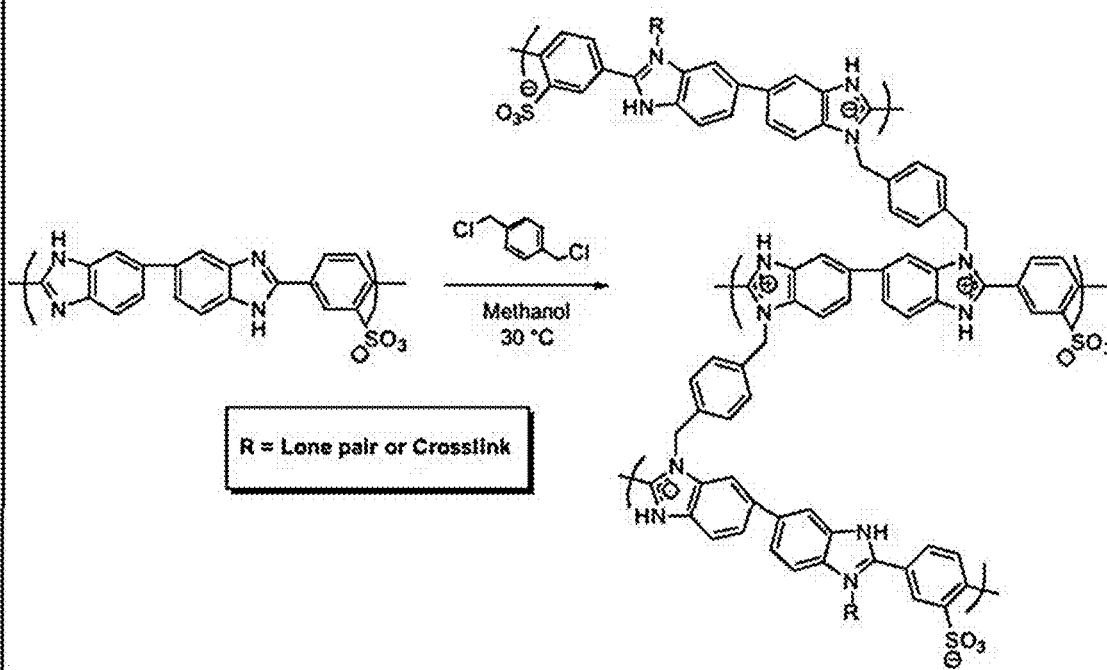
FIG. 4

Table 1. Ex-situ properties of s-PBI gel membranes compared to dense m-PBI films.

| Membrane | $VO^{2+}$ Permeability ($cm^2 \cdot s^{-1}$) | Conductivity ($mS \cdot cm^{-1}$)[a] | Conductivity ($mS \cdot cm^{-1}$)[b] | % Polymer Solids | % Sulfuric Acid | % Water |
|---|---|---|---|---|---|---|
| s-PBI | $5.74 \times 10^{-7}$ | 593 | 242 | 18.8 | 23.11 | 58.1 |
| s-PBI-x | $5.23 \times 10^{-7}$ | 537 | 240 | 30.6 | 35.6 | 33.8 |
| m-PBI (conventionally imbibed) | $2.53 \times 10^{-11}$ | 13.1 | 12.2 | 65.6 | 26.0 | 8.4 |

Conductivity at r.t. after soaking in 2.6 M sulfuric acid
Conductivity at r.t. after soaking in V(IV)/H+ solution (1.5 M $VOSO_4$ + 2.6 M sulfuric acid) for 3 days

FIG. 5

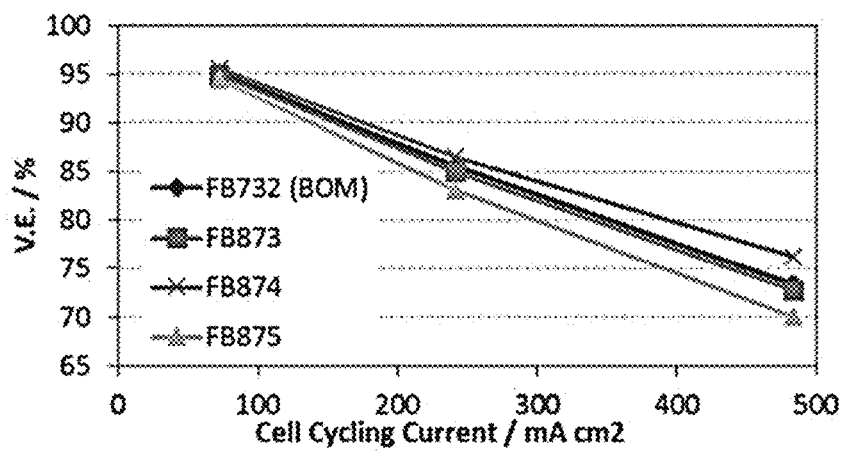

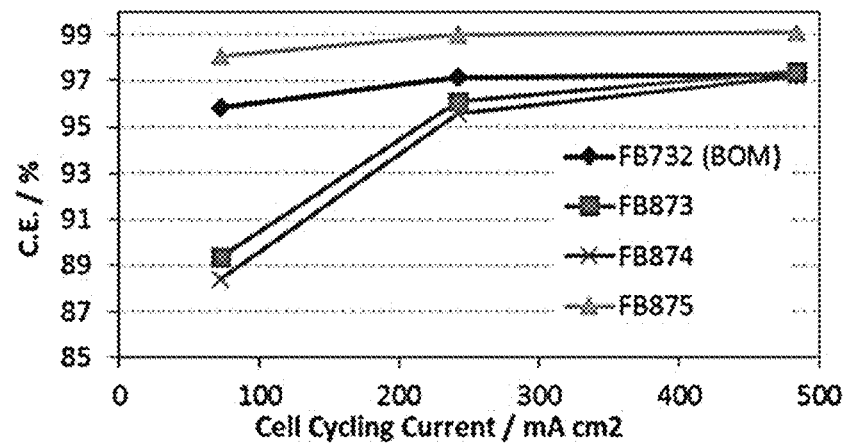

FIG. 6

| Current Density (mA/cm²) | C.E. (%) | E.E. (%) | V.E. (%) |
|---|---|---|---|
| 72 | 98.3 | 93.2 | 94.8 |
| 242 | 99.5 | 83.3 | 83.6 |
| 483 | 99.8 | 70.5 | 70.5 |

| Current Density (mA/cm²) | C.E. (%) | E.E. (%) | V.E. (%) |
|---|---|---|---|
| 72 | 88.4 | 84.5 | 95.5 |
| 242 | 95.7 | 83.6 | 87.3 |
| 483 | 97.2 | 74.2 | 76.2 |

| Current Density (mA/cm²) | C.E. (%) | E.E. (%) | V.E. (%) |
|---|---|---|---|
| 72 | 90.63 | 85.58 | 94.42 |
| 242 | 96.96 | 81.17 | 83.71 |
| 483 | 98.59 | 69.69 | 70.69 |

| Current Density (mA/cm²) | C.E. (%) | E.E. (%) | V.E. (%) |
|---|---|---|---|
| 72 | 92.48 | 86.75 | 93.78 |
| 242 | 94.18 | 73.78 | 78.34 |
| 483 | 87.37 | 54.16 | 61.90 |

| Current Density (mA/cm²) | C.E. (%) | E.E. (%) | V.E. (%) |
|---|---|---|---|
| 72 | 91.47 | 85.88 | 93.88 |
| 242 | 96.35 | 77.27 | 80.20 |
| 483 | 95.43 | 61.34 | 64.28 |

| Current Density (mA/cm²) | C.E. (%) | E.E. (%) | V.E. (%) |
|---|---|---|---|
| 72 | 99.9 | 79.28 | 77.96 |
| 242 | -- | -- | -- |
| 483 | -- | -- | -- |

| Sample | Modulus (MPa) | Stress at Break (MPa) | Strain at Break (%) |
|---|---|---|---|
| 1 | 2115.64 | 106.93 | 50.49 |
| 2 | 2049.62 | 104.61 | 43.15 |
| 3 | 1975.35 | 102.41 | 42.02 |
| 4 | 2416.99 | 102.42 | 41.32 |
| 5 | 1934.70 | 107.83 | 54.42 |
| Average | 2098.46 ± 191 | 104.84 ± 2.5 | 46.28 ± 5.84 |

| Sample | Modulus (MPa) | Stress at Break (MPa) | Strain at Break (%) |
|---|---|---|---|
| 1 | 2683.99 | 138.80 | 14.29 |
| 2 | 3422.44 | 129.02 | 10.53 |
| 3 | 2975.56 | 114.75 | 7.90 |
| 4 | 3051.97 | 125.72 | 12.76 |
| Average | 3033.49 ± 303 | 127.07 ± 9.9 | 11.37 ± 2.78 |

| Sample | Modulus (MPa) | Stress at Break (MPa) | Strain at Break (%) |
|---|---|---|---|
| 1 | 1771.72 | 108.07 | 26.01 |
| 2 | 2006.96 | 123.35 | 31.07 |
| 3 | 1790.64 | 110.20 | 33.60 |
| 4 | 2076.39 | 131.11 | 33.48 |
| 5 | 1998.40 | 108.09 | 24.74 |
| Average | 1928.82 ± 138 | 116.16 ± 10.5 | 29.78 ± 4.17 |

| Sample | Modulus (MPa) | Yield Stress (MPa) | Yield Strain (%) | Stress at Break (MPa) | Strain at Break (%) |
|---|---|---|---|---|---|
| 1 | 1736.68 | 108.72 | 6.09 | 97.44 | 24.00 |
| 2 | 1256.07 | 102.81 | 5.78 | 87.87 | 17.80 |
| 3 | 1197.81 | 104.17 | 5.97 | 91.65 | 19.25 |
| 4 | 1104.77 | 110.99 | 6.57 | 104.86 | 31.13 |
| 5 | 1833.26 | 105.42 | 5.66 | 91.35 | 18.63 |
| 6 | 1670.85 | 107.44 | 5.90 | 98.36 | 25.46 |
| 7 | 1692.01 | 106.28 | 5.69 | 102.94 | 34.04 |
| 8 | 1675.59 | 108.62 | 5.95 | 103.46 | 30.80 |
| Average | 1520.88±284 | 106.81±2.7 | 5.95±0.29 | 97.24±6.4 | 25.14±6.32 | ns
PBI FILMS FORMED WITHOUT USE OF ORGANIC SOLVENTS

CROSS REFERENCE TO RELATED APPLICATION

This application is a Continuation Application of U.S. patent application Ser. No. 16/569,983, now U.S. Pat. No. 11,180,621, having a filing date Sep. 13, 2019, which claims filing benefit of U.S. Provisional Patent Application Ser. No. 62/731,152, having a filing date of Sep. 14, 2018, and U.S. Provisional Patent Application Ser. No. 62/731,156, having a filing date of Sep. 14, 2018, all of which are incorporated herein by reference in their entirety.

STATEMENT REGARDING FEDERALLY SPONSORED RESEARCH OR DEVELOPMENT

This invention was made with government support under DE-AR0000767, awarded by the Department of Energy. The government has certain rights in the invention.

BACKGROUND

The present invention relates to a process for making polybenzimidazole (PBI) films starting from gel PBI membranes polymerized and cast in the polyphosphoric acid (PPA) process wherein acid-imbibed gel PBIs are neutralized in a series of water baths and undergo controlled drying, optionally in association with a substrate or porous material, yielding a PBI film without the use of organic solvents.

Polybenzimidazole (PBI) is a glassy thermoplastic with exceptional thermal stability (427° C. $T_g$), broad chemical resistance, and the ability to function as a proton-acceptor or proton-donor. PBI is uniquely suited for moving protons, hydrogen, and water. For these reasons, PBI is highly suited for $H_2/CO_2$ separation membranes, fuel cell proton exchange membranes, and organic chemical pervaporation dehydration membranes—many for use at high temperature.

A novel synthetic process for producing high molecular weight PBIs, the "PPA Process" was developed at Rensselaer Polytechnic Institute with cooperation from BASF Fuel Cell GmbH. The general synthesis of PBI by this method requires the combination of a tetraamine with a dicarboxylic acid in polyphosphoric acid (PPA) in a dry environment. The step-growth polycondensation reaction typically occurs around 200° C. for 16-24 hours in a nitrogen atmosphere, producing high molecular weight polymer. This solution is cast directly as a thin film on a substrate, and upon absorption of water, the PPA hydrolyzes in situ to form phosphoric acid. Note that PPA is a good solvent for PBI while phosphoric acid (PA) is a poor solvent. Under controlled hydrolysis conditions, a mechanically stable PBI gel membrane that is highly doped with phosphoric acid is produced.

In one commercial usage, PA doped meta-polybenzimidazole (m-PBI) fuel cell membranes are produced and maintain thermal and physical stability while operating at high temperature. The PPA process produces membranes with much higher proton diffusion coefficients and conductivities and creates a membrane with a proton-transport architecture superior to that of the conventionally imbibed PBI membrane. In addition, inherent viscosity data indicates that the PPA process produces polymers of much higher molecular weight. It has been shown that improved membrane morphology and increased molecular weight allow the polymer to retain much more phosphoric acid than traditionally cast PBI membranes. An increased PA doping level typically improves the conductivity of the membrane and may even increase the performance of the cell.

PBI films are known to have excellent properties such as high temperature stability, non-flammability, and high chemical resistance. Until now, the process for making PBI films has involved polymerization, dissolving the resulting polymer in an organic solvent such as dimethylacetamide (DMAc), casting the film, and removing the solvent in a series of washes.

Accordingly, it is an object of the present disclosure to provide a new and improved process for making PBI films starting from gel PBI membranes polymerized and cast in the PPA process. As the current disclosure explains infra, the acid-imbibed gel PBIs may be neutralized in a series of water baths and may undergo controlled drying, optionally applied to or between two sheets of porous material or on a suitable substrate, yielding a PBI film without using or employing organic solvents. In addition, PBI gels synthesized in the PPA process are able to use a wider range of monomers due to their low solubility in organic solvents. Thus, the current invention gives access for the first time to more extensive PBI chemistries that can be processed to a film.

SUMMARY

The above objectives are accomplished according to the present disclosure by providing in one embodiment a process for making PBI films. The process may include forming a gel PBI membrane via a PPA process, rinsing the gel PBI membrane, restraining the gel PBI membrane in at least an X-Y plane direction, and drying the rinsed gel PBI membrane, wherein no organic solvent is employed throughout the process. Further, the gel PBI membrane may be rinsed with a wash. Still yet, the rinsed gel PBI membrane may be applied to at least one substrate. Further yet, the rinsed gel PBI membrane may be applied to a porous substrate. Further again, restraining the PBI membrane may place tension on the PBI membrane in an X-, Y- or Z-plane direction. Further still, a PBI film may be formed via a continuous formation process. Further yet, the polybenzimidazole of the PBI film comprises one or more of the following repeating units:

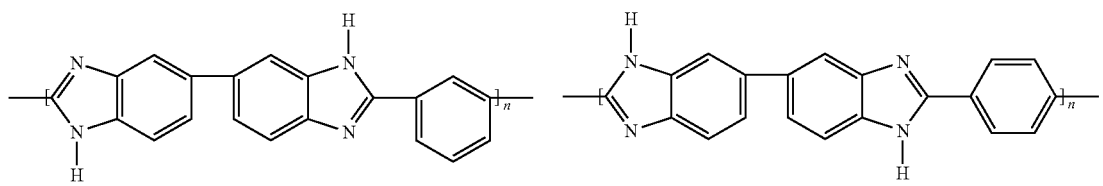

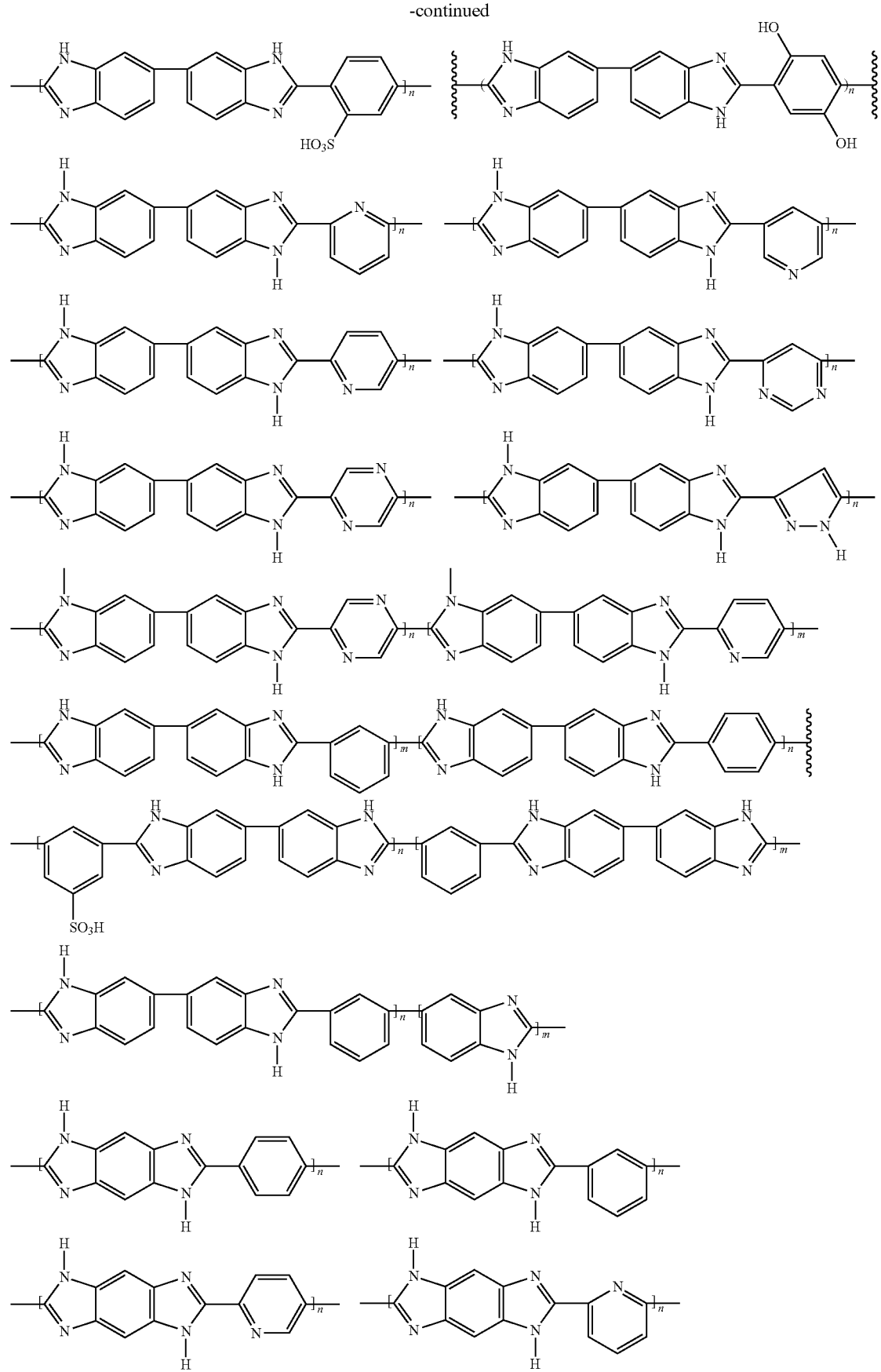

-continued

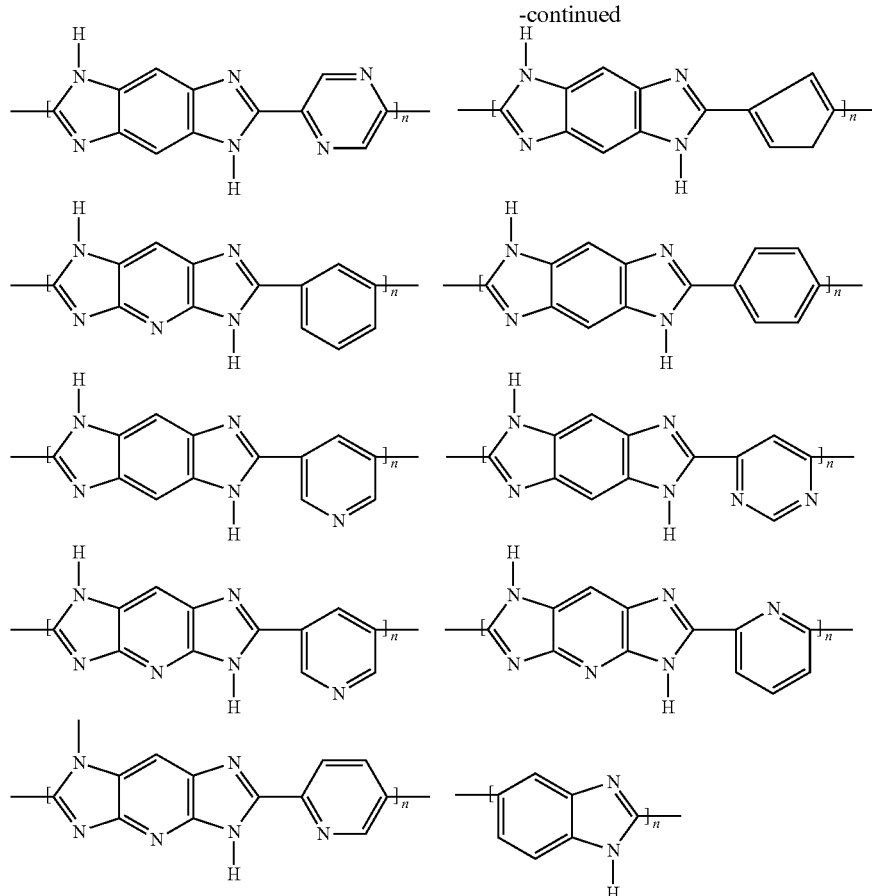

or any combination thereof, in which n and m are each independently 1 or greater, about 10 or greater, or about 100 or greater. Still yet the process may form a film.

In a further embodiment, a PBI film is formed. The film may include forming a gel PBI membrane via a PPA process, rinsing the gel PBI membrane, restraining the gel PBI membrane in at least an X-Y plane direction, drying the rinsed gel PBI membrane to form the PBI film; and wherein no organic solvent is employed throughout the process to form the film. Still again, the film may be used as a coating. Still yet, the film may have a thickness of from 5 to 150 μm. Further yet, the film has a stress at break of at least 25 MPa. Still again, the polybenzimidazole of the PBI film may comprise one or more of the following repeating units:

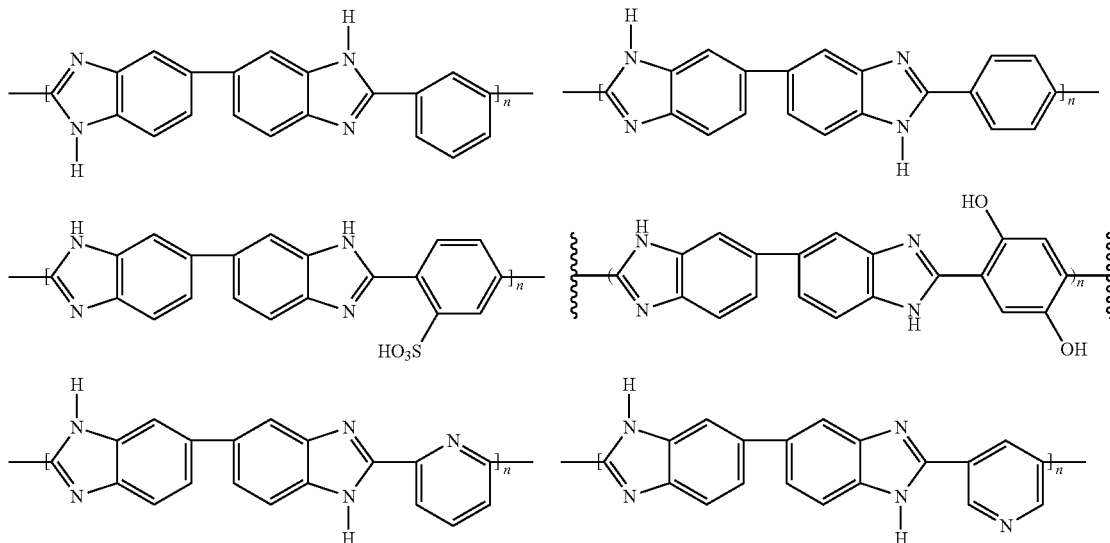

-continued

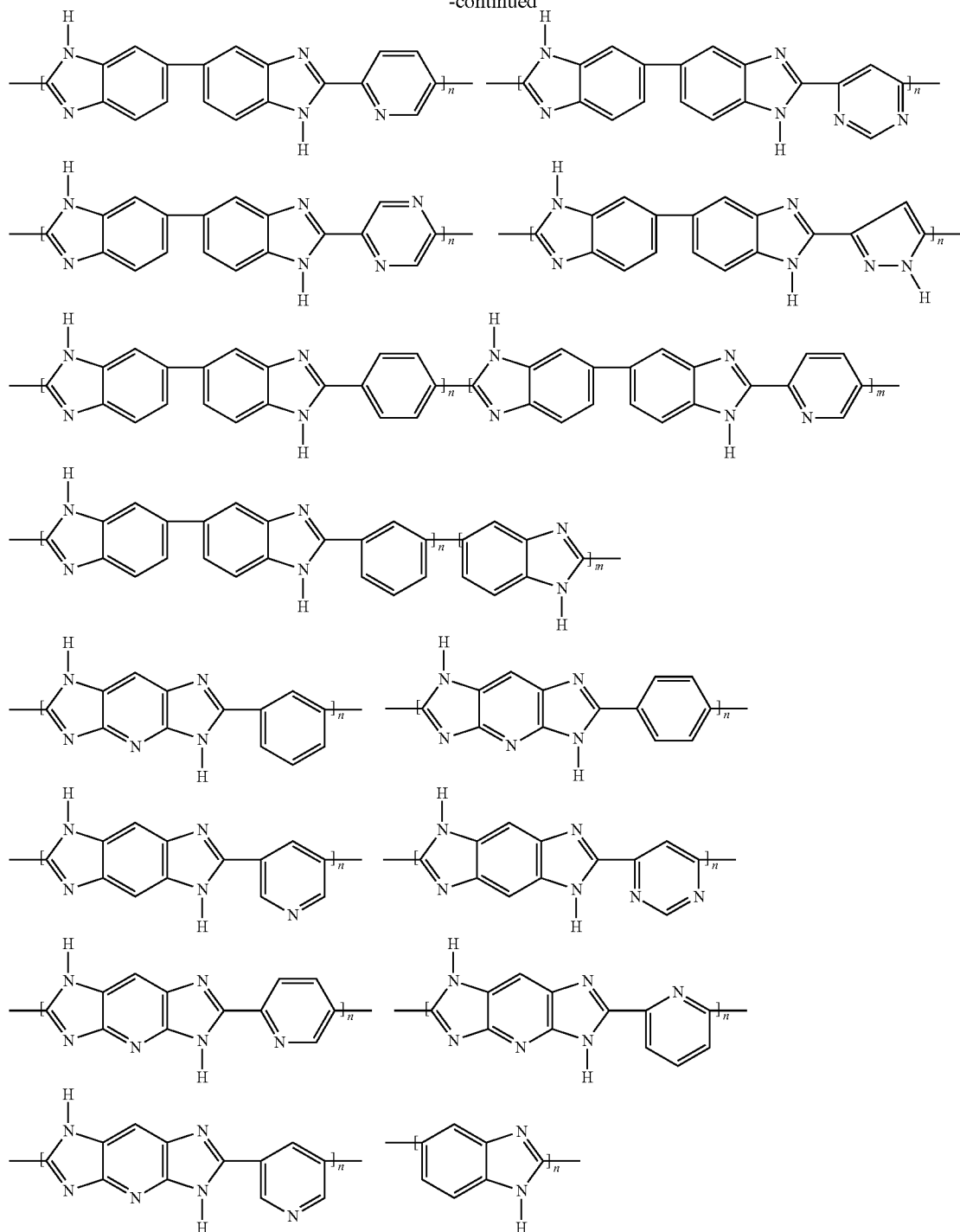

or any combination thereof, in which n and m are each independently 1 or greater, about 10 or greater, or about 100 or greater. Still yet, the film may include a PBI polymer which is substantially insoluble in organic solvents. Still again, the film may be imbibed with an organic or inorganic acid or base to form an ionically conducting membrane.

BRIEF DESCRIPTION OF THE FIGURES

The construction designed to carry out the invention will hereinafter be described, together with other features thereof. The invention will be more readily understood from a reading of the following specification and by reference to the accompanying Figures forming a part thereof, wherein an example of the invention is shown and wherein:

FIG. 3 shows results of an Oxidative Stability Test for membranes of the current disclosure.

FIG. 4 shows a polymerization scheme of sulfonated polybenzimidazole (5-PBI) in PPA and membrane crosslinking modification reaction.

FIG. 5 shows Table 1—Ex-situ properties of s-PBI gel membranes compared to dense m-PBI films.

FIG. 6 shows performance of membranes of the current disclosure vis-à-vis commercially available membranes.

Figure 1:
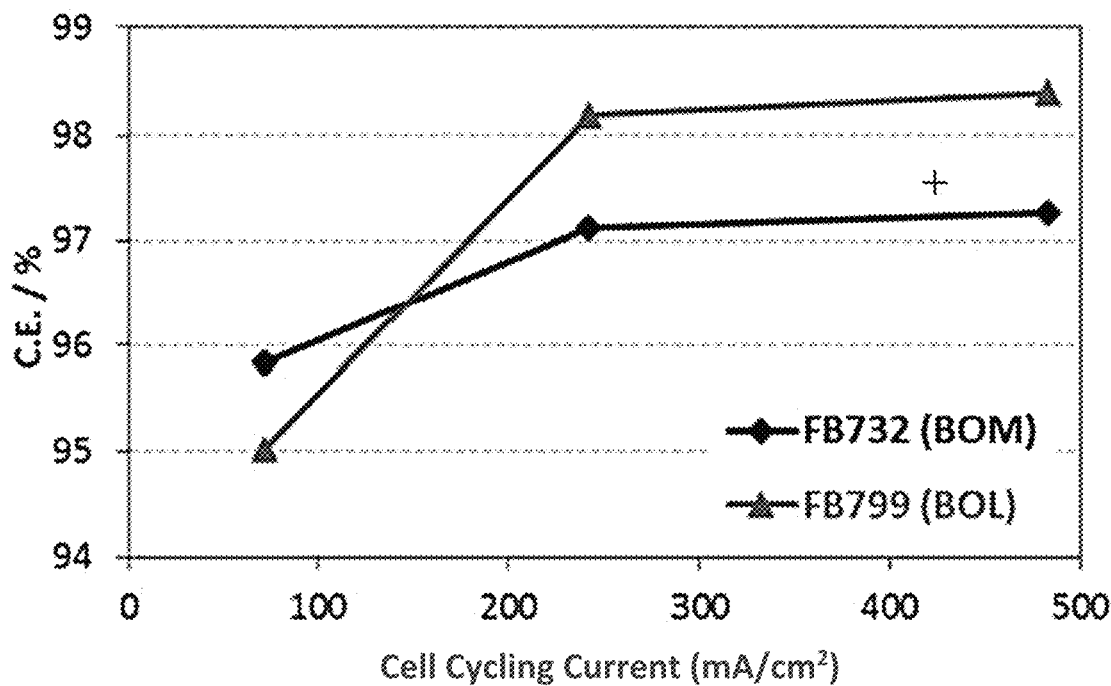
FIG. 1 shows a graph of cell cycling current for membranes of the current disclosure.

It will be understood by those skilled in the art that one or more aspects of this invention can meet certain objectives, while one or more other aspects can meet certain other objectives. Each objective may not apply equally, in all its respects, to every aspect of this invention. As such, the preceding objects can be viewed in the alternative with respect to any one aspect of this invention. These and other objects and features of the invention will become more fully apparent when the following detailed description is read in conjunction with the accompanying Figures and Examples. However, it is to be understood that both the foregoing summary of the invention and the following detailed description are of a preferred embodiment and not restrictive of the invention or other alternate embodiments of the invention. In particular, while the invention is described herein with reference to a number of specific embodiments, it will be appreciated that the description is illustrative of the invention and is not constructed as limiting of the invention. Various modifications and applications may occur to those who are skilled in the art, without departing from the spirit and the scope of the invention, as described by the appended claims. Likewise, other objects, features, benefits and advantages of the present invention will be apparent from this summary and from certain embodiments described below, and will be readily apparent to those skilled in the art. Such objects, features, benefits, and advantages will be apparent from the above in conjunction with the accompanying examples, data, Figures, and all reasonable inferences to be drawn therefrom, alone or with consideration of the references incorporated herein.

DETAILED DESCRIPTION

With reference to the Figures, the invention will now be described in more detail. Unless defined otherwise, all technical and scientific terms used herein have the same meaning as commonly understood to one of ordinary skill in the art to which the presently disclosed subject matter belongs. Although any methods, devices, and materials similar or equivalent to those described herein can be used in the practice or testing of the presently disclosed subject matter, representative methods, devices, and materials are herein described.

Unless specifically stated, terms and phrases used in this document, and variations thereof, unless otherwise expressly stated, should be construed as open ended as opposed to limiting. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements, or components of the disclosure may be described or claimed in the singular, the plural is contemplated to be within the scope thereof unless limitation to the singular is explicitly stated. The presence of broadening words and phrases such as "one or more," "at least," "but not limited to," or other like phrases in some instances shall not be read to mean that the narrower case is intended or required in instances where such broadening phrases may be absent.

This invention details a novel process for making PBI films without using an organic solvent. Eliminating the need for an organic solvent offers a novel route to producing PBI films that is cheaper, less time consuming, decreases worker exposure substantially, and produces less chemical waste than previous methods. The new solventless process is scalable and also allows for a wider range of PBI chemistries to be made into a film as the prior usage of organic solvents limited the chemistries that may be incorporated into PBI membranes.

Herein, methods and processes for providing chemically resistant and thermally stable PBI films synthesized for the first time without an organic solvent are provided. Previously, the synthesis of PBI films has been an expensive and time-consuming process that involves harsh chemicals. The current disclosure provides a process that does not require the use of an organic solvent, thereby making it a greener, more environmentally friendly process. This process is also considered safer since it reduces worker exposure to organic solvents. By overcoming the need for an organic solvent, the process for making PBI films is cheaper and less time consuming.

PBI films produced without an organic solvent lowers the associated expense of purchasing solvent and does away with expensive and time-consuming disposal of hazardous waste produced from using organic solvents. The current disclosure's process for obtaining a PBI film is simpler and provides for a wider range of PBI chemistries than previously available. Importantly, commercial applications of the current disclosure include, but are not limited to, aerospace coatings, wire coatings, microelectronic packaging, protective window and glass coatings, gas separation membranes, high temperature materials/films, films with high chemical resistance, and ion exchange membranes.

In one aspect of the current disclosure, sulfonated polybenzimidazole (s-PBI) gel membranes were prepared and shown to have a high stability in concentrated sulfuric acid and strongly oxidizing vanadium solutions. These membranes were considered candidates for use in vanadium redox flow batteries, and compared to the commonly used "conventionally imbibed" meta-polybenzimidazole (m-PBI) membranes cast from N,N'-dimethylacetamide (DMAc) solutions. The s-PBI membranes exhibited high conductivities and low performance degradation during in-cell testing.

Redox flow batteries are used to convert electrical energy into chemical energy. That chemical energy can then be, as needed, transformed back to electrical energy. These devices are capable of storing grid-scale amounts of energy. However, at this time, the widespread adoption of flow batteries is limited by the high cost of device fabrication. This cost, though, can be mitigated by reducing the size of the electrochemical stack. To accomplish this effectively and maintain high power densities, the battery must be able to operate under high current loads. Traditional membranes used in flow batteries are poor ionic conductors and are unable to sustain operation under these conditions, thus, the need for a larger stack. The current disclosure provides, in part, PBI-based high-performing batteries with high conductivity and low in-cell resistance allowing the batteries to operate under high current load conditions with high performance. With these properties, a smaller, less costly electrochemical stack can be used.

PBI gel membranes synthesized from the PPA process can be neutralized and imbibed with an electrolyte typically used in flow batteries. This developed process and usage of PBI membranes exploits the superior physical properties to be used in such an application.

In one instance, PBI gel membranes have been made to be used with a sulfuric acid electrolyte which is typically used in redox flow batteries. These membranes have higher ionic conductivity than any previously reported literature on the subject, and these membranes can be used in batteries for the renewable energy sector and/or in current power grids for backup/reducing energy interruption during peak usage times.

The current disclosure allows for higher performing flow batteries operating under high current loads. These operating conditions mitigate the need for large electrochemical stacks, and thereby, reduce the overall cost of commercial flow battery devices. Further, the membranes of the present disclosure exhibit superior performance due to their high ionic conductivity. This, in turn, reduces the cost of the overall build by reducing the necessary stack size.

Figure 2:
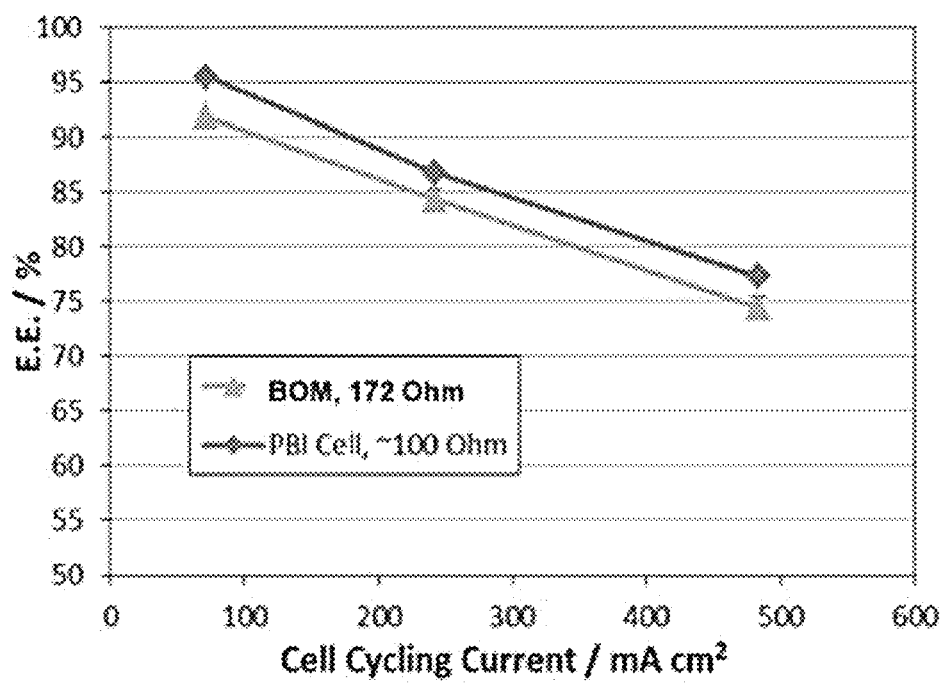
FIG. 2 shows a further graph of cell cycling current for membranes of the current disclosure.

FIGS. 1 and 2 show the increased performance of PBI gel membranes at higher current densities. The use and fabrication of such devices with these membranes with inherently higher ionic conductivities allow for increased rate capabilities of the batteries. The cost of the overall battery can be drastically reduced due to the need for a smaller stack size. Note: all data shown are PBI membranes except those marked with "BOM."

Further, membranes of the current disclosure do not show degradation in oxidative vanadium solutions. Applicant understands there are no fully hydrocarbon membranes with this degree of chemical stability, suggesting PBI gel membranes are advantageous membranes for long-term devices. FIG. 3 shows results of an Oxidative Stability Test for membranes of the current disclosure.

Increasing demands on the energy sector have created a new need for large-scale energy storage devices with additional implications in grid management and back-up power, coincidentally with the seamless integration of new renewable energy devices. Redox flow batteries have the potential to both efficiently store large amounts of energy as well as meet cost expectations. In a VRFB, a major portion of the cost is attributed to the vanadium electrolyte; however, this cost can be offset with a cheaper cell stack design. Currently, in commercial VRFBs, PFSA (e.g., Nafion® perfluorosulfonic acid) membranes are used in the stack component, which has limited their forward progress due to their low selectivity and high cost. To reduce costs of VRFBs and increase overall performance, there has been a surge in membrane development activities tailored to the specific needs of VRFBs.

Phosphoric acid doped PBI membranes are most notably known for their performance in high-temperature polymer electrolyte membranes. However, PBI membranes have been shown to be a favorable candidate for multiple new devices, such as electrochemical hydrogen separation, $SO_2$ depolarized electrolyzers, and redox flow batteries.

To date, research on PBI membranes for flow batteries has focused around meta-polybenzimidazole (m-PBI) and its derivatives—membranes prepared by solution casting in N,N'-dimethylacetamide (DMAc) to form a dense film and later imbibing the formed film in the desired electrolyte, coined the "conventional imbibing process." Membranes prepared by this method typically have pore sizes that range from 0.5 nm to 2.0 nm, which is much smaller than the pore sizes found in PFSA (e.g., Nafion®) type membranes (2-4 nm). This decrease in interstitial space allows for the dramatically decreased permeability of vanadium ions compared to PFSA membranes, but also accounts for its extremely low conductivities when imbibed in common VRFB electrolyte solutions (<20 mS·cm$^{-1}$). The focal point of these recent works is to enhance the proton conductivity while maintaining the inherently low permeability of m-PBI dense films. These techniques include pre-swelling the PBI films in concentrated phosphoric acid before doping with sulfuric acid, using the vapor-induced phase inversion method, using the nonsolvent-induced phase separation to create a spongy porous structure, and the grafting of various substituents to the PBI polymer backbone. To the best of Applicant's knowledge, no research has been conducted on the use of PBI gel membranes, formed from the PPA process, as alternative membranes for redox flow batteries.

The conventional imbibing process of PBI membranes is a time consuming, environmentally unfriendly technique that adds cost to the membrane fabrication process. However, Xiao et al. developed the novel PPA process to prepare PBI gel membranes which consists of a direct casting of the polymerization solution comprising the PBI polymer in polyphosphoric acid (PPA). Subsequent exposure of the cast solution to atmospheric moisture or controlled humidity conditions at room temperature hydrolyzes the PPA solvent, a good solvent for PBI, to phosphoric acid (PA), which is a poor solvent for PBI. This process induces a solution to gel transition forming a PBI gel membrane inherently imbibed in PA. Although these membranes are "pre-imbibed" in PA, it has been shown that these membranes are capable of undergoing acid exchange of the imbibed electrolyte. Garrick et al. exchanged the PA in sulfonated para-polybenzimidazole (s-PBI) membranes with 50 wt. % sulfuric acid solutions for testing in a $SO_2$-depolarized electrolyzer used to generate hydrogen. The membrane exhibited high stability in concentrated sulfuric acid, even at 120° C. Furthermore, the membrane resistance in the $SO_2$-depolarized electrolyzer was found to be almost negligible in comparison to the anodic overpotential, and this is attributed to the high ionic conductivity of s-PBI. Due to the exceptional stability of the PBI derivative and its high conductivity, s-PBI polymer gel membranes are envisioned as possible alternative membranes for vanadium redox flow batteries with increased rate capabilities.

FIG. 4 shows a polymerization scheme of s-PBI in PPA and a membrane crosslinking modification reaction. The rate capability of a flow battery is highly dependent on the conductivity of the membrane. m-PBI membranes prepared from the conventional imbibing process have relatively low conductivities, limiting stable operation at high current densities. Herein, we investigate the use of a highly proton conductive membrane, s-PBI, for their use in VRFBs.

FIG. 5 shows Table 1—Ex-situ properties of s-PBI gel membranes compared to dense m-PBI films.

The ex-situ membrane properties for s-PBI gel membranes (both uncrosslinked and crosslinked) and m-PBI membranes formed from the conventional imbibing process are shown in Table 1, see FIG. 5. The conductivity at room temperature of the membranes was evaluated in both 2.6 M sulfuric acid and a V(IV)/H$^+$ solution found in typical operating cell conditions. s-PBI gel membranes exhibit surprisingly high conductivities as compared to the m-PBI membranes in both sulfuric acid and the acid electrolyte solution, 537-593 mS·cm$^{-1}$ compared to 13.1 mS·cm$^{-1}$ and 240-242 mS·cm$^{-1}$ compared to 12.2 mS·cm$^{-1}$, respectively. The slight difference in conductivity between the two s-PBI membranes is likely a result of crosslinking. s-PBI-x in Table 1 is a s-PBI film that underwent a crosslinking modification post-hydrolysis of the membrane. The crosslinker forms bonds with the imidazole nitrogen and may slightly inhibit a protons path through the hydrogen bond networks. When comparing imbibed solutions, the decrease in conductivity of the gel membranes in vanadium electrolyte solutions is thought to occur from two factors. The first being that vanadium ions may interact with the membrane by attractive forces with the negatively charged sulfonate group (pKa~-2), impeding the flow of protons. More so, the dramatic drop in conductivity in the PBI gel membranes is most likely attributed to the intrinsic conductivity of the electrolyte solution containing vanadium ions.

Since the major contributor of proton conductance is the mobility of ions, it is not surprising that an increase in vanadium concentration would diminish proton conductivity of the electrolyte solution solely with regard to an increase in viscosity of the electrolyte solution. PBI gel membranes have a considerably open morphology that enhances proton conductivity by allowing not only proton transport via the Grotthuss mechanism, but also via mobility of the electrolyte in the membrane; thus, proton transport through the membrane will also be affected by the increase in viscosity due to the incorporation of vanadium ions.

With that said, the electrolyte mobility in the PBI gel membrane is a plausible argument as to why vanadium permeability is significantly more than its dense counterpart. This result is also not unexpected when considering the polymer solids of the membrane. Looking at FIG. 5, it is evident s-PBI has a relatively small amount of polymer per the amount of electrolyte in the membrane compared to m-PBI. Expecting PBI gel membranes to have high crossover of vanadium ions, we devised a mitigation route in which we could chemically crosslink the PBI chains together to fill interstitial space and limit chain mobility. At first glance, the permeability of the s-PBI-x is less than ideal; however, this slight modification does have an impact when compared to the unmodified version and without having a dramatic effect on conductivity. Since this technique is impartial to the PBI derivative of choice, it could be used to hone the properties of PBI membranes as needed. At this time, we have not found a facile way to determine the cross-link density of the gel membrane, as typical gravimetric and rheological techniques carry large amounts of error with as cast imbibed gel membranes. However, to confirm crosslinking occurred, a 50 mg sample of neutralized dried membrane was heated in 800 mL N,N'-dimethylacetamide at reflux for 48 hours. Under these conditions no membrane deterioration or solution color change was observed for the crosslinked sample, but dissolution was observed for the pristine polymer film. Furthermore, the swell ratios of the crosslinked vs. non-crosslinked membranes affords noteworthy results. Utilizing a non-acid solvent (N,N'-dimethylacetamide) to ensure that unwanted solvent polymer interactions were suppressed, it was found that the non-crosslinked gel (3.94 wt. % increase) absorbed approximately 0.75 wt. % more solvent than the crosslinked membrane (3.25 wt. % increase). Restriction of chain mobility by chemical crosslinks inhibits solvent swelling of the polymer gel, resulting in lower weight increase from solvent uptake.

s-PBI gel membranes were synthesized via the PPA process to afford membranes stable in sulfuric acid and oxidative V(V) solutions. The membranes exhibited high conductivities and good cell performance especially at high current densities. These membranes, however, have inherently high vanadium ion crossover due to the open morphology and low polymer solids content. Vanadium crossover was shown to be inhibited via chemical crosslinks, although still high compared to dense membranes. However, this crosslinking method is transferrable to many PBI chemistries and can be used to further decrease crossover in PBI gel membranes without significant losses in proton conductivity.

Currently, PBI gel membranes used in flow batteries offer a superior performance than those stated in literature. However, the crossover of redox species lessens the long-term overall efficiency of the battery. One further aspect of the current disclosure mitigates the high crossover transport properties of typical membranes without significant loss in performance.

PBI gel membranes exhibited exceptional performance in redox flow batteries. Membranes formed via this process can be neutralized and doped with the typical electrolyte used in these applications. The use of these membranes has a cost advantage over those in literature due to their intrinsically high ionic conductivity which allows them to be used under high current load operations. Under these conditions, the size of the stack can be considerably reduced, mitigating the prohibitive cost to commercialize. Although the membranes used as-is offer high performance, their permeability of the redox couples inhibits long-term efficiency.

Through novel 1-directional and 2-directional stretching methods, the transport mechanism of redox couples can be inhibited without a significant loss in overall performance.

In one aspect of the current disclosure, improvements upon membranes used in redox flow batteries via post-modification are provided. Under these processing techniques, the transport properties of the membrane are changed without affecting the ionic conductivity of protons.

This disclosure, in one aspect, offers a membrane capable of performing under high current loads, reducing the cost of the overall battery, and improves upon the long-term efficiency by decreasing crossover of the redox active species. Such membranes can be used in the renewable energy sector and/or in current power grids for backup/reducing energy interruption during peak usage times.

New processing techniques of formed membranes allow for increased performance due to the decrease in transport of reactive species. These membranes outperform ones typically used in commercial VRFBs today. See FIG. 6, which shows performance of membranes of the current disclosure vis-à-vis commercially available non-PBI membranes. Note: all data shown are PBI membranes except those marked with "BOM."

Figure 7:
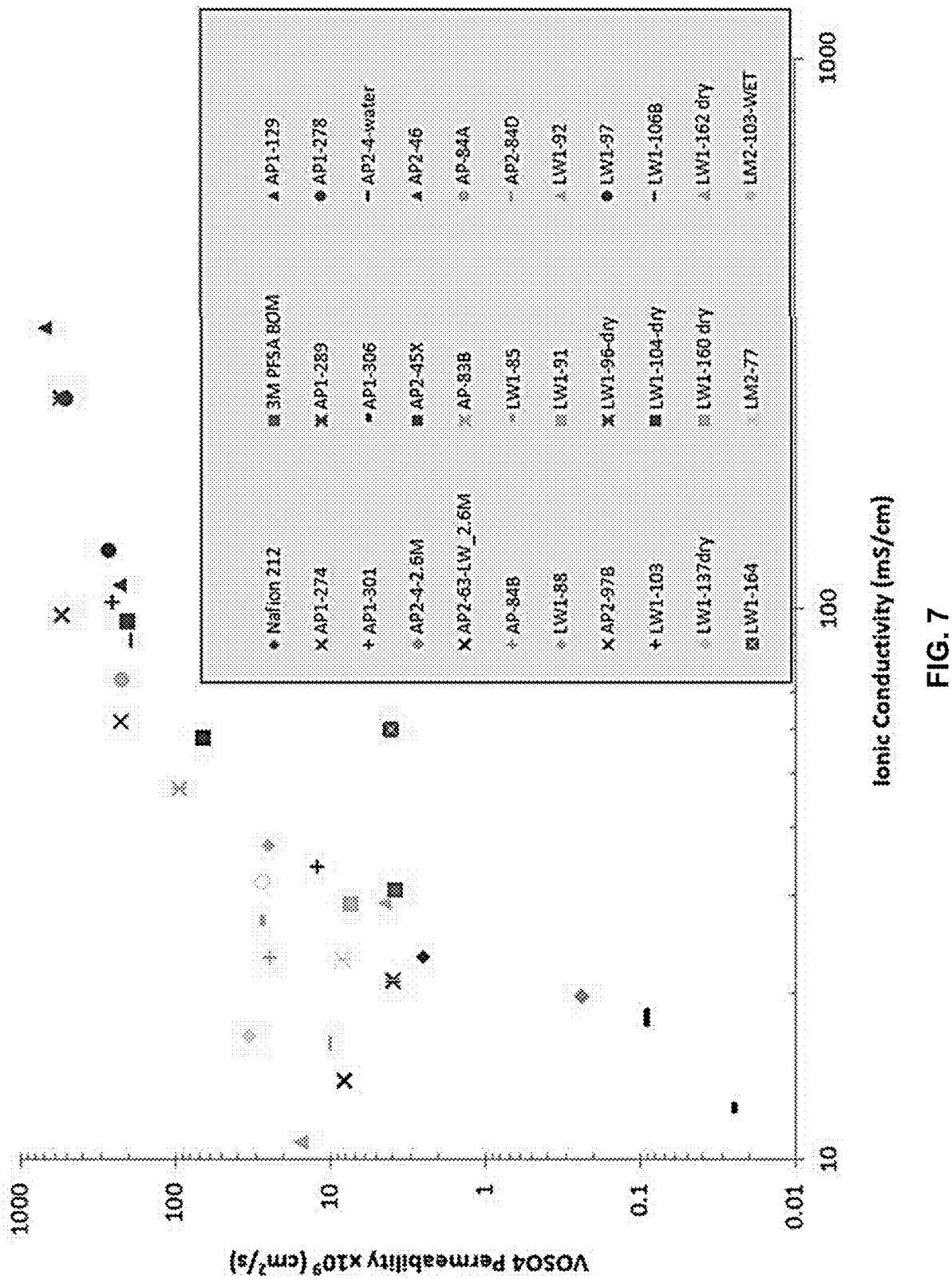
FIG. 7 shows a graph of measured ex-situ properties of membranes of the current disclosure compared to typical PBI gel membranes.

FIG. 7 shows a graph of measured ex-situ properties of membranes of the current disclosure compared to typical PBI gel membranes. The novel processing techniques allow for huge changes in the membrane properties. These types of changes are uncommon in commercial membranes and give flexibility to the end user when designing a new or revamping an existing device. Permeability of membranes of the following disclosure may be characterized by:

$$V_B \frac{dC_B(t)}{dt} = A\frac{P}{L}(CA(t) - CB(t))$$

wherein $V_B$=solution in the right reservoir; CB(t)=$VO^{2+}$ concentration in the right cell; CA(t)=$VO^{2+}$ concentration in the left cell; A=effective area; L=membrane thickness; and P=permeability of $VO^{2+}$.

Figure 8:
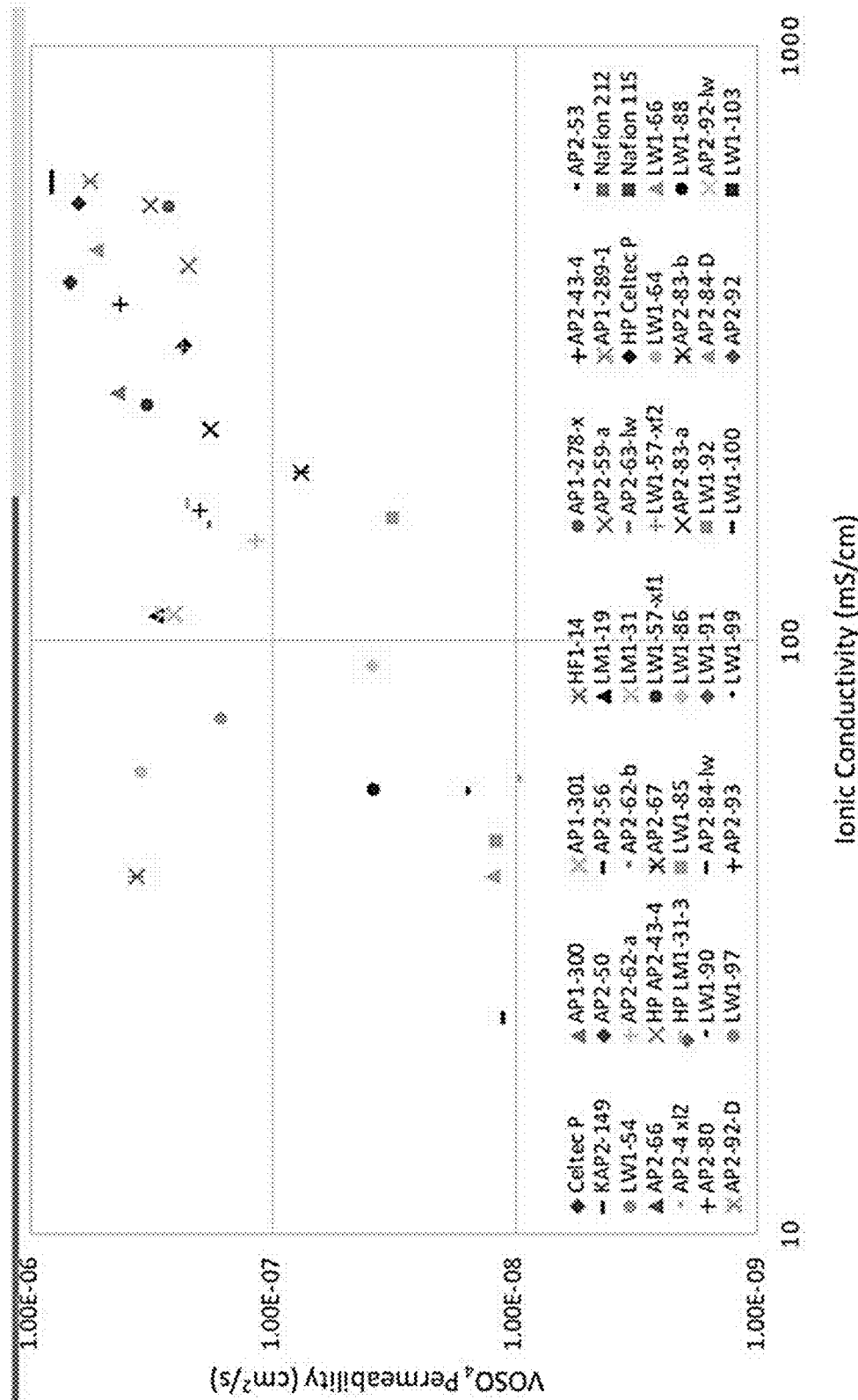
FIG. 8 shows overall ex-situ measurements of membranes of the current disclosure.

FIG. 8 shows overall ex-situ measurements of membranes of the current disclosure.

Figure 9:
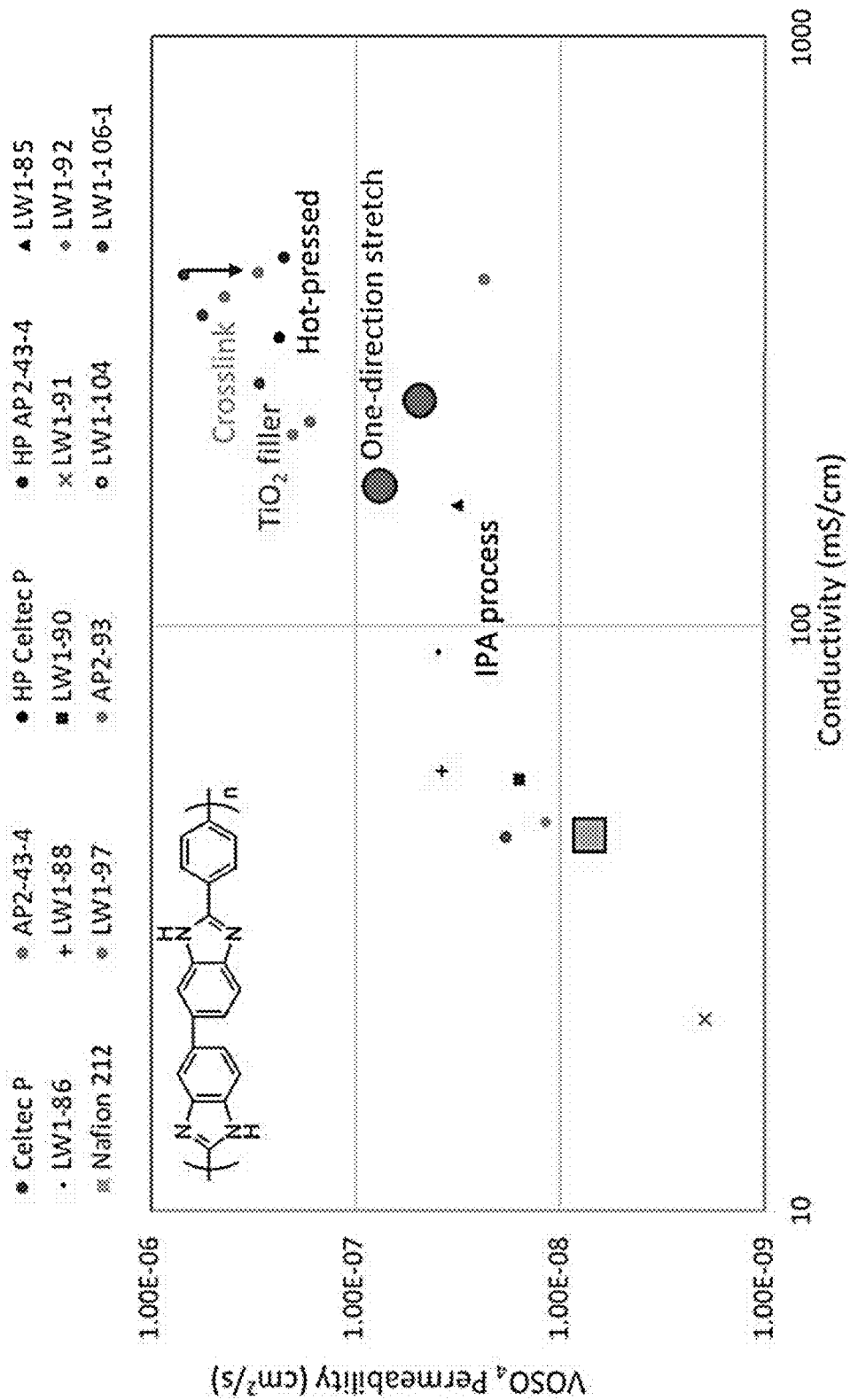
FIG. 9 shows a graph presenting permeability compared to conductivity on para-BPI.

FIG. 9 shows a comparison of permeability compared to conductivity on para-BPI.

Figure 10:
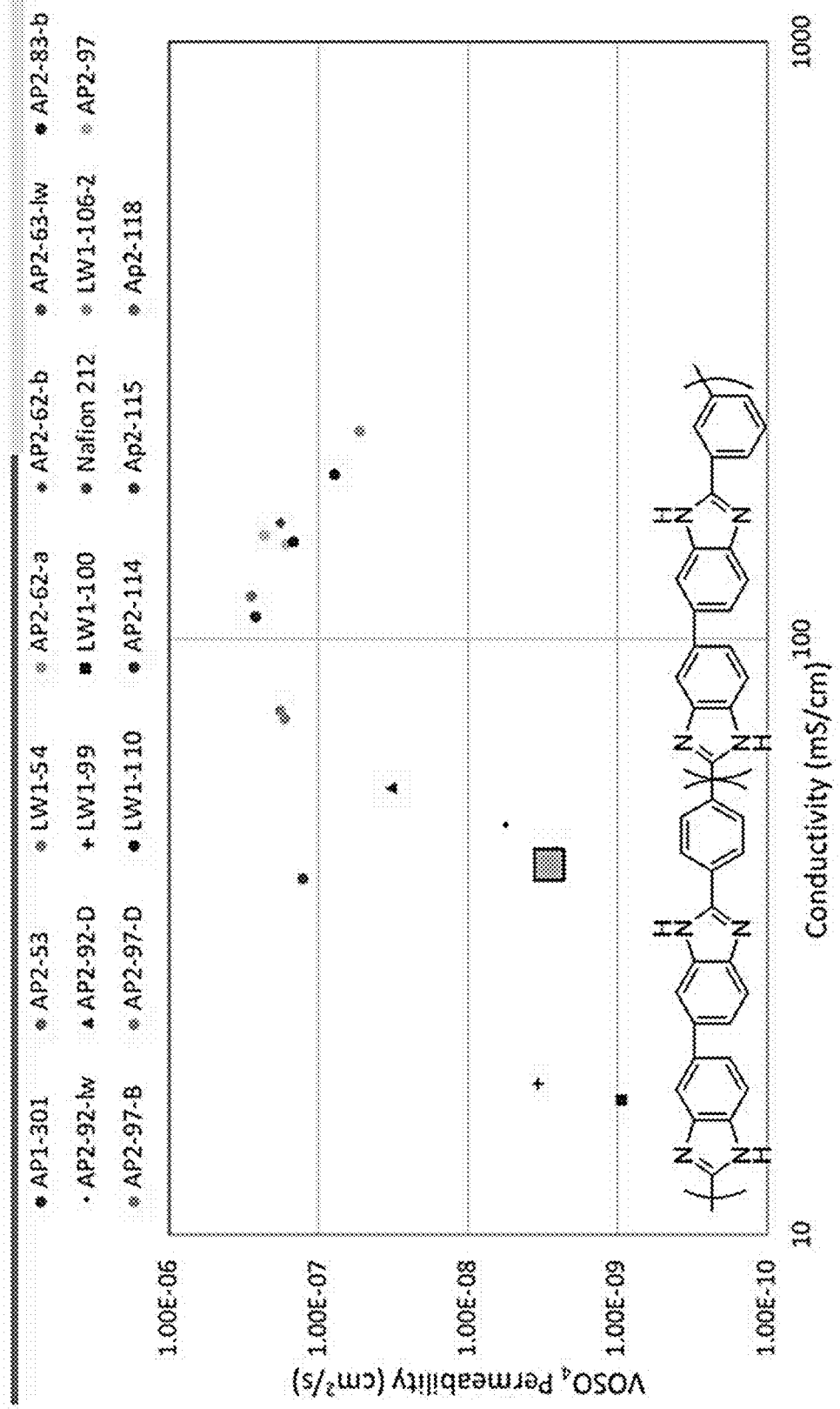
FIG. 10 shows permeability compared to conductivity on a BPI copolymer as illustrated in the Figure.
Figure 11:
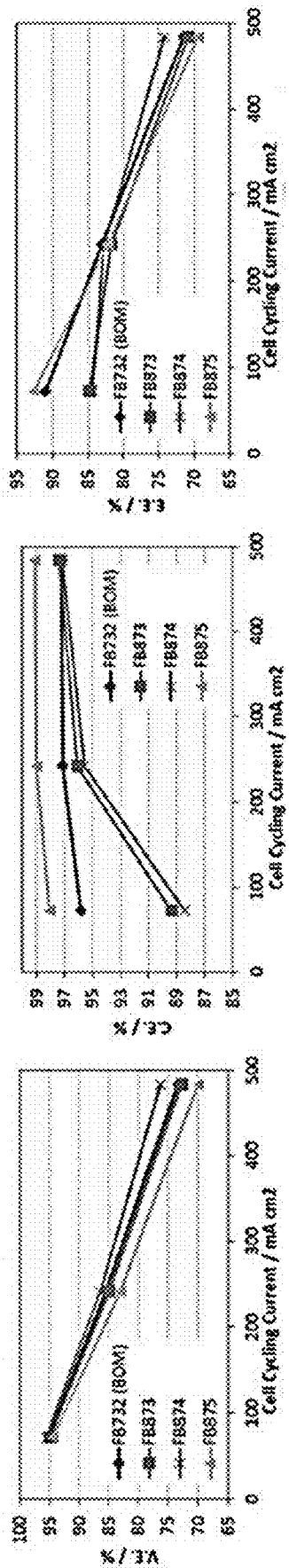
FIG. 11 shows cell testing results of membranes formed per the current disclosure.

FIG. 10 shows a comparison of permeability compared to conductivity on BPI, as illustrated in FIG. 10. FIG. 11 shows cell testing results of membranes formed per the current disclosure. Overall, PBI membranes formed pursuant to the current disclosure demonstrated high conductivity and stability in concentrated SA. Further, para-PBI membrane permeability can be decreased to 4.55E-08 cm²/s while maintaining proton conductivity at 246 mS/cm in 2.6 M SA. Also, a VRFB operated with modified para-PBI membrane shows over 98% coulombic efficiency under a high cell cycling current densities ranges from 100 to 450 mA/cm².

The improved methods provided herein are based upon PBI membranes, and more specifically, PBI gel membranes. As utilized herein, the term "gel" generally refers to a polymeric matrix that can incorporate a high liquid content and maintain a self-supporting structure. For instance, a PBI gel membrane as described herein can incorporate about 60 wt. % or more, about 65 wt. % or more, about 75 wt. % or more, about 80 wt. % or more, or about 85 wt. % or more liquid by weight of the composite membrane (total solids plus liquid content) without loss of structure of the polymeric matrix. In one embodiment, a PBI gel membrane can incorporate from about 60 wt. % to about 95 wt. % liquid while maintaining a self-supporting, semi-rigid structure, i.e., capable of being manipulated and exhibiting pliability without loss of structure of the polymeric matrix. In addition, a PBI gel membrane can be processed to remove liquid from the gel and then re-imbibed with a liquid to re-swell without loss of structure of the polymeric matrix.

The membranes formed via the current process provide, in one aspect, high conductivity and low resistance, allowing operation under high current load conditions with high performance, which can translate to uses such as batteries with smaller and less costly electrochemical stacks providing the same or better performance as compared to other technologies. For instance, a redox flow battery membrane as described can exhibit an in-plane ionic conductivity in a 2.6 M sulfuric acid solution of about 100 mS/cm or greater, about 200 mS/cm or greater, or about 300 mS/cm or greater in some embodiments. Crosslinked membranes can exhibit extremely high in-plane ionic conductivity, such as about 300 mS/cm or greater, about 400 mS/cm or greater, or about 500 mS/cm or greater. For instance, a redox flow battery can exhibit an in-plane ionic conductivity in a 2.6 M sulfuric acid solution of from about 100 mS/cm to about 600 mS/cm, in some embodiments.

In addition, batteries incorporating disclosed membranes can operate at high current density, for instance about 100 mA/cm² or higher, e.g., from about 100 mA/cm² to about 500 mA/cm² in some embodiments. Moreover, batteries incorporating a redox flow battery membrane as described can operate at high efficiency. By way of example, at a current density of 242 mA/cm², a redox flow battery incorporating a membrane as described can exhibit a coulombic efficiency (CE) of about 90% or greater, for instance from about 93% to about 99% in some embodiments; an energy efficiency (EE) of about 75% or more, for instance from about 78% to about 85% in some embodiments; and a voltage efficiency (VE) of about 80% or more, for instance from about 81% to about 87%. At a current density of 483 mA/cm², a redox flow battery as described can exhibit a CE of 90% or greater, for instance from about 94% to about 98% in some embodiments; an EE of about 65% or more, for instance from about 65% to about 75% in some embodiments; and a VE of about 65% or more, for instance from about 66% to about 77%.

As described further herein, the disclosed gel membranes are formed according to a method that includes hydrolysis of the PPA polymer solvent and the subsequent solidification of the PBI polymer in the hydrolysis product. It is believed that this in situ hydrolysis and polymer solidification leads to formation of an ordered polymeric matrix that differs in molecular structure from the traditional, organic solution-cast PBI membranes that are cast as a solution of an organic solvent followed by solidification by removal of the organic solvent via, e.g., heating. In particular, it is believed that the PBI gel membrane structure includes a more open and ordered framework as compared to traditional PBI membranes, with the framework of the PBI matrix providing a stable gel membrane that exhibits the improved electrochemical properties as described.

To form PBI gel membranes that may be used with the method of the current disclosure, a polymerization composition can be formed that includes a PPA and the PBI-forming compounds of choice, e.g., PBI-forming monomers. The monomer content of the polymerization composition can generally be low, for instance about 10 wt. % or less, about 8 wt. % or less, or about 5 wt. % or less in some embodiments.

The PBI polymer of the PBI gel membrane can have any PBI structure as is generally known in the art and can be formed by polymerization of PBI-forming compounds including at least one aromatic or heteroaromatic tetraamino compound and at least one aromatic or heteroaromatic polycarboxylic acid or ester, anhydride, or acid chloride thereof or at least one aromatic or heteroaromatic diaminocarboxylic acid. Heteroaromatic compounds encompassed herein include aromatic systems that contain at least one nitrogen, oxygen, sulfur or phosphorus atom in an aromatic ring.

Examples of aromatic and heteroaromatic tetraamino compounds as may be utilized in forming the PBI gel membrane can include, without limitation, 2,3,5,6-tetraminopyridine, 3,3',4,4'-tetraminodiphenylsulfone, 3,3',4,4'-tetraminodiphenyl ether, 3,3',4,4'-tetraminobiphenyl, 1,2,4,5-tetraminobenzene, 3,3',4,4'-tetraminobenzophenone, 3,3',4,4'-tetraminodiphenylmethane and 3,3',4,4'-tetraminodiphenyldimethyl-methane and the salts thereof, e.g., the mono-, di-, tri- and tetrahydrochloride salts, as well as any combination of aromatic or heteroaromatic tetraamino monomers.

In one embodiment, an aromatic polycarboxylic acid can include a dicarboxylic acid. A dicarboxylic acid can be utilized alone or in combination with one or more additional polycarboxylic acid compounds, e.g., tricarboxylic acids and/or tetracarboxylic acids. When incorporated, the content of tricarboxylic acid or tetracarboxylic acids can generally be about 30 mol % or less, for instance from about 0.1 mol % to about 20 mol %, or from about 0.5 mol % to about 10 mol % based on the amount of one or more dicarboxylic acid compounds. An ester of a polycarboxylic acid can be utilized such as C1-C20-alkyl esters or C5-C12-aryl esters of a polycarboxylic acid. An anhydride of a polycarboxylic acid or an acid chloride of a polycarboxylic acid can be polymerized according to disclosed methods.

Examples of aromatic dicarboxylic acids can include, without limitation, pyridine-2,5-dicarboxylic acid, pyridine-3,5-dicarboxylic acid, pyridine-2,6-dicarboxylic acid, pyridine-2,4-dicarboxylic acid, 4-phenyl-2,5-pyridinedicarboxylic acid, 3,5-pyrazoledicarboxylic acid, 2,6-pyrimidinedicarboxylic acid, 2,5-pyrazinedicarboxylic acid, 2,4,6-pyridinetricarboxylic acid, benzimidazole-5,6-dicarboxylic acid, 5-hydroxyisophthalic acid, 4-hydroxyisophthalic acid, 2-hydroxyterephthalic acid, 5-aminoisophthalic acid, 5-N,N-dimethylaminoisophthalic acid, 5-N,N-diethylaminoisophthalic acid, 2,5-dihydroxyterephthalic acid, 2,6-dihydroxyisophthalic acid, 4,6-dihydroxyisophthalic acid, 2,3-dihydroxyphthalic acid, 2,4-dihydroxyphthalic acid, 3,4-dihydroxyphthalic acid, 1,8-dihydroxynaphthalene-3,6-dicarboxylic acid, diphenylsulfone-4,4'-dicarboxylic acid, isophthalic acid, terephthalic acid, phthalic acid, 3-fluorophthalic acid, 5-fluoroisophthalic acid, 2-fluoroterephthalic acid, tetrafluorophthalic acid, tetrafluoroisophthalic acid, tetrafluoroterephthalic acid, 3-sulfophthalic acid, 5-sulfoisophthalic acid, 2-sulfoterephthalic acid, tetrasulfophthalic acid, tetrasulfoisophthalic acid, tetrasulfoterephthalic acid, 1,4-naphthalenedicarboxylic acid, 1,5-naphthalenedicarboxylic acid, 2,6-naphthalenedicarboxylic acid, 2,7-naphthalenedicarboxylic acid, diphenic acid, diphenyl ether 4,4'-dicarboxylic acid, benzophenone-4,4'-dicarboxylic acid, biphenyl-4,4'-dicarboxylic acid, 4-trifluoromethylphthalic acid, 2,2-bis(4-carboxyphenyl)hexafluoropropane, 4,4'-stilbenedicarboxylic acid and 4-carboxycinnamic acid or any combination thereof.

Examples of aromatic tricarboxylic acids and esters, acid anhydrides, and acid chlorides thereof can include, without limitation, 1,3,5-benzenetricarboxylic acid (trimesic acid); 1,2,4-benzenetricarboxylic acid (trimellitic acid); (2-carboxyphenyl)iminodiacetic acid, 3,5,3'-biphenyltricarboxylic acid; and 3,5,4'-biphenyltricarboxylic acid; or any combination thereof.

Examples of aromatic tetracarboxylic acids and esters, acid anhydrides, and acid chlorides thereof can include, without limitation, 3,5,3',5'-biphenyltetracarboxylic acid; benzene-1,2,4,5-tetracarboxylic acid; benzophenonetetracarboxylic acid; 3,3',4,4'-biphenyltetracarboxylic acid; 2,2',3,3'-biphenyltetracarboxylic acid; 1,2,5,6-naphthalenetetracarboxylic acid; and 1,4,5,8-naphthalenetetracarboxylic acid; or any combination thereof.

Heteroaromatic carboxylic acids can include heteroaromatic dicarboxylic acids, heteroaromatic tricarboxylic acids, and heteroaromatic tetracarboxylic acids, including their respective esters such as C1-C20-alkyl esters, C5-C12-aryl esters, or the acid anhydrides or the acid chlorides of the heteroaromatic carboxylic acids. Examples of heteroaromatic carboxylic acids include, without limitation, pyridine-2,5-dicarboxylic acid, pyridine-3,5-dicarboxylic acid, pyridine-2,6-dicarboxylic acid, pyridine-2,4-dicarboxylic acid, 4-phenyl-2,5-pyridinedicarboxylic acid, 3,5-pyrazoledicarboxylic acid, 2,6-pyrimidinedicarboxylic acid, 2,5-pyrazinedicarboxylic acid, 2,4,6-pyridinetricarboxylic acid, benzimidazole-5,6-dicarboxylic acid, and also their C1-C20-alkyl esters or their C5-C12-aryl esters, or their acid anhydrides or their acid chlorides, or any combination thereof.

In one embodiment, the polymerization composition can include a diaminocarboxylic acid, examples of which include, without limitation, diaminobenzoic acid and the mono and dihydrochloride derivatives of said acid, as well as 1,2-diamino-3'-carboxy acid 4,4'-diphenyl ether, or any combination thereof.

PPA as can be utilized in the polymerization composition can be commercial PPA as obtainable, for example, from Riedel-de Haen. PPA can include concentrated grades of PA ($H_3PO_4$) above 100%. At high concentrations, the individual $H_3PO_4$ units are polymerized by dehydration and the PPA can be expressed by the formula $H_{n+2}P_nO_{3n+1}$ (n>1).

The PPA [$H_{n+2}P_nO_{3n+1}$ (n>1)] can have a $P_2O_5$ content as calculated by acidimetry of about 70 wt. % or more, for instance about 75 wt. % or more, or about 82 wt. % or more, for instance from about 70 wt. % to about 86 wt. % in some embodiments. The polymerization composition can be in the form of a solution of the monomers/compounds, or a dispersion/suspension of the monomers/compounds in the PPA, generally depending upon the nature of the compounds to be polymerized and any additional components of the polymerization solution.

The polymerization can be carried out at a temperature and for a time until suitable polymerization of the compounds has taken place, which can generally be determined by an increase in viscosity of the polymerization composition. The increase in viscosity can be determined by visual inspection, through determination of the intrinsic viscosity, or by any other suitable means. For instance, the polymerization can continue until the polymerization composition exhibits an intrinsic viscosity of about 0.8 dL/g or greater, for instance about 1.0 dL/g or greater, or about 1.5 dL/g or greater, in some embodiments. The polymerization temperature can generally be about 220° C. or less, for instance about 200° C. or less, such as about 100° C. to 195° C. in some embodiments. The polymerization can be carried out over a time of from a few minutes (e.g., about 5 minutes) up to several hours (e.g., about 100 hours). In one embodiment, the polymerization composition can be heated in a stepwise fashion, for instance in three or more steps, each step lasting from about 10 minutes to about 5 hours and increasing the temperature by about 15° C. or more for each step. Of course, the particular polymerization conditions can be varied, depending generally upon the reactivity and concentration of the particular monomers, as would be evident to one of skill in the art, and no particular polymerization conditions are required in formation of the redox flow battery membranes.

Exemplary PBI polymer repeating units of a PBI gel membrane can include, without limitation:

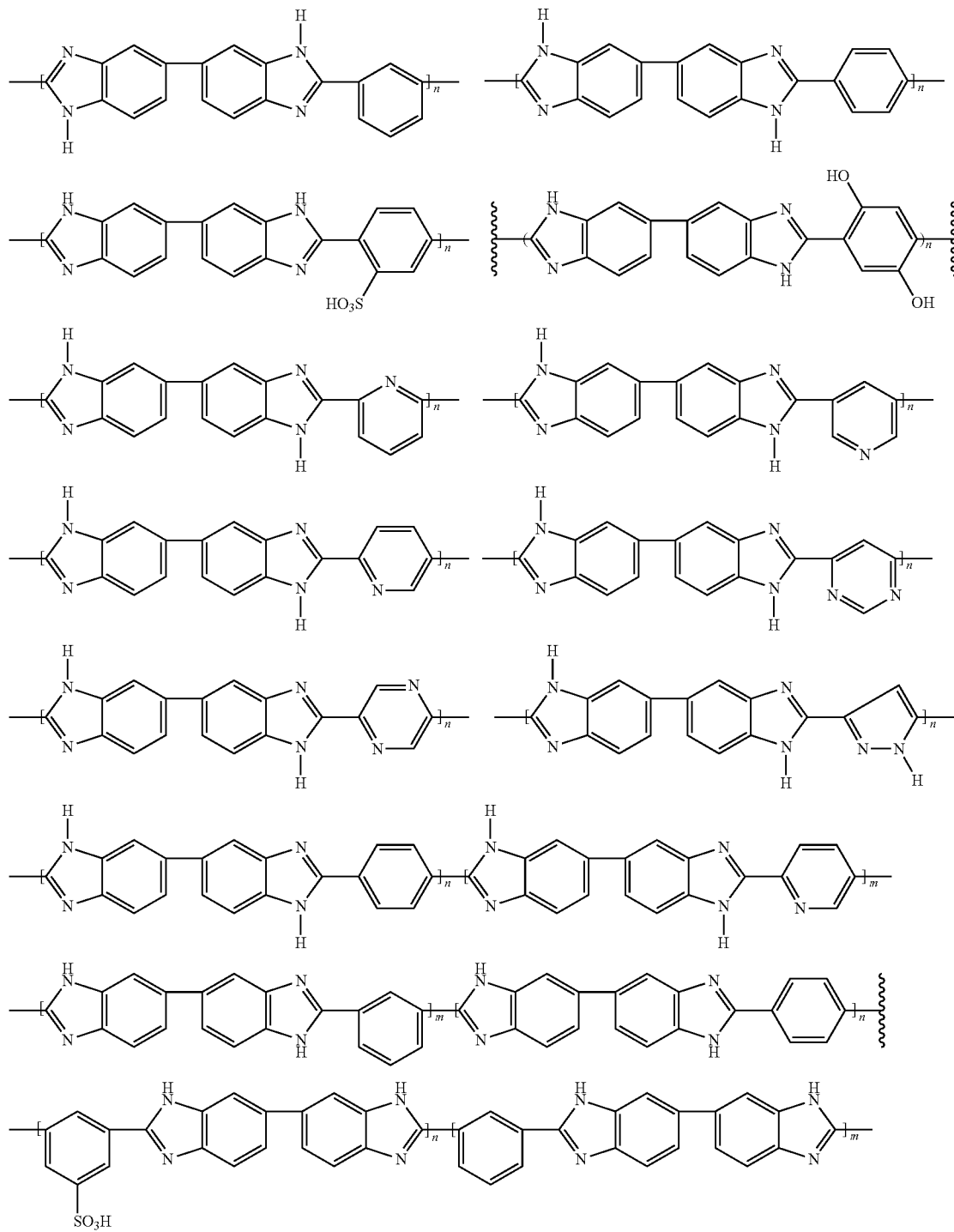

-continued

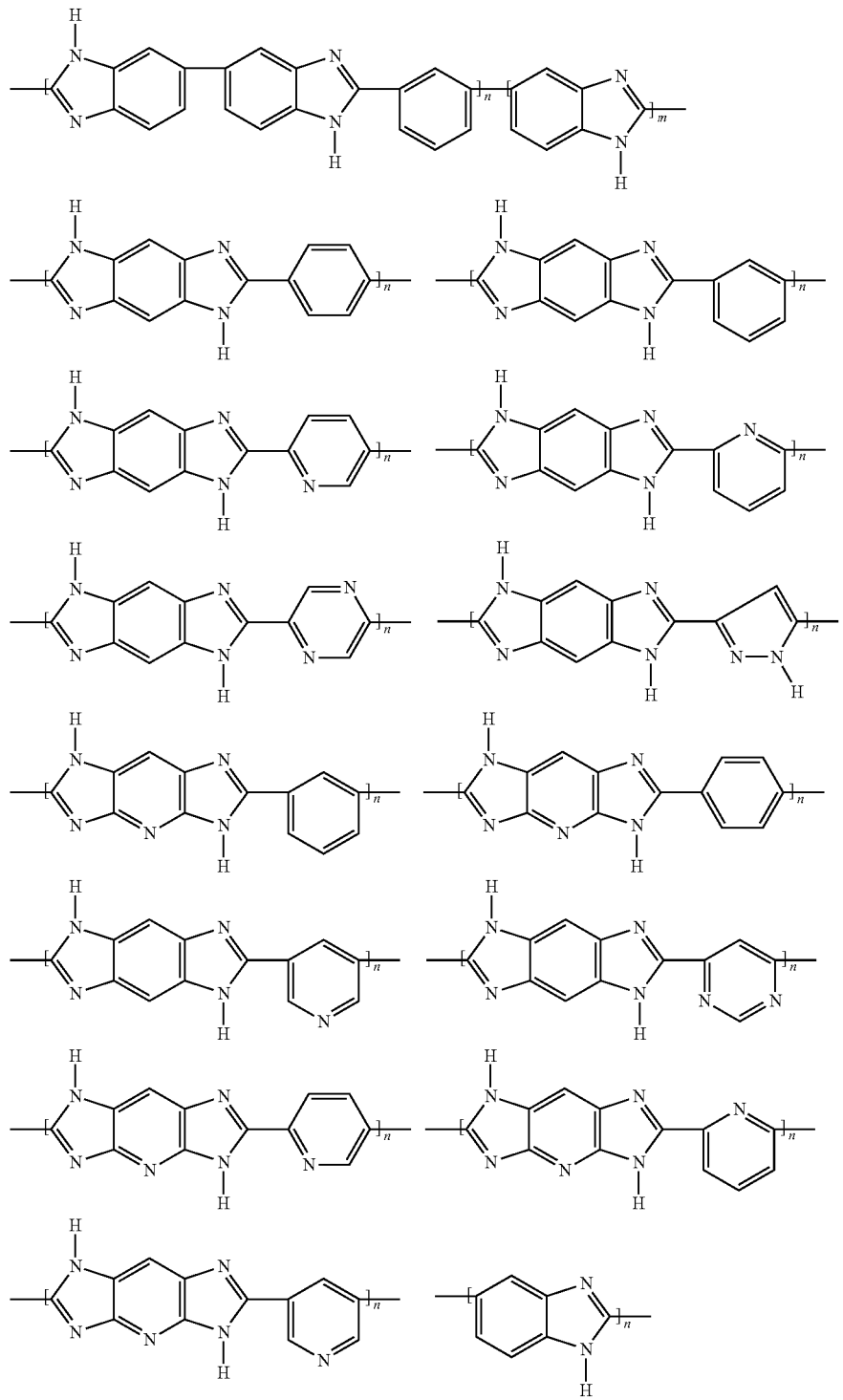

or any combination thereof, in which n and m are each independently 1 or greater, about 10 or greater, or about 100 or greater, in some embodiments.

A PBI polymer of a membrane as disclosed herein can include any repeating unit including any derivatization thereof as is generally known in the art, examples of which are well within the knowledge of one of skill in the art, representative examples of which have been described, for instance in US Patent Application Publication No. 2013/0183603 to Benicewicz, et al., which is incorporated by reference herein.

Following polymerization, the polymer can be in solution in the PPA solvent, and the PBI polymer solution can be processed to form a gel membrane precursor having a desired thickness. Beneficially, the polymer solution as well as the gel membrane precursor and eventual gel membrane and redox flow battery membrane formed of the polymer solution can be free of organic solvents.

The membrane precursor can be formed according to any suitable formation process, such as, and without limitation to, casting, spray coating, knife coating, etc. For instance, the gel membrane precursor can be formed to a thickness of from about 20 micrometers (μm) to about 4,000 μm in one embodiment, such as from about 30 μm to about 3,500 μm, or from about 50 μm to about 1,000 μm, in some embodiments.

To solidify the polymer and form the PBI gel membrane, the PBI polymer solution can be treated in the presence of water and/or moisture to hydrolyze at least a portion of the PPA of the solution. Upon hydrolysis, the PPA will hydrolyze to form PA and water, thereby causing a sol-gel transfer of the PBI polymer solution and solidification of the polymer, as the PBI polymer is less soluble in PA as compared to PPA.

The hydrolysis treatment can be carried out at temperatures and for a time sufficient for the gel membrane to solidify so as to be self-supporting and capable of being manipulated without destruction while incorporating high liquid content (e.g., about 60 wt. % or higher liquid content of the total solid and liquid content of the membrane). By way of example, the hydrolysis treatment can be carried out at a temperature of from about 0° C. to about 150° C., for instance from about 10° C. to about 120° C., or from about 20° C. to about 90° C., e.g., at ambient temperature in some embodiments (e.g., at a relative humidity contacting environment of from about 35% to 100%).

The hydrolysis can be carried out by contact of the gel membrane precursor with $H_2O$, for instance in the form of a liquid or vapor, and/or in the presence of other components. For instance, the gel membrane precursor can be contacted with water vapor and/or liquid water and/or steam and/or aqueous PA (e.g., a PA solution having a PA concentration of from about 10 wt. % to about 90 wt. %, e.g., about 30 wt. % to about 70 wt. % or about 45 wt. % to about 55 wt. %). The treatment can be carried out under standard pressure, but this is not a requirement of a formation process, and in some embodiments, the hydrolysis treatment can be carried out under a modified pressure.

In one embodiment, the hydrolysis can be carried out in a climate-controlled environment in which the $H_2O$ content can be tightly controlled. For example, the moisture content of the local environment can be controlled through control of the temperature or saturation of the fluid contacting the precursor membrane. For example, carrier gases such as air, nitrogen, carbon dioxide or other suitable gases can carry $H_2O$, e.g., steam, in a controlled amount for contact with the precursor membrane.

The hydrolysis treatment time can generally vary depending upon parameters such as, e.g., $H_2O$ content and form of the contact, membrane thickness, contact temperature, etc. In general, the hydrolysis treatment can be carried out in a time period of between a few seconds to a few minutes, for instance when the hydrolysis treatment utilizes superheated steam, or alternatively, over a period of several days, for example when the hydrolysis treatment is carried out at ambient temperature and low relative atmospheric moisture. In some embodiments, the hydrolysis treatment can be carried out over a period of time between about 10 seconds and about 300 hours, for instance from about 1 minute to about 200 hours. By way of example, in an embodiment in which the at least partial hydrolysis of the PPA of the PBI polymer solution is carried out at room temperature (e.g., about 20° C.) with ambient air of relative atmospheric moisture (i.e., relative humidity) content of from about 20% to 100%, for instance from about 40% to about 80%, the treatment time can generally be between about 5 hours and about 200 hours.

Upon hydrolysis of at least a portion of the PPA of the PBI polymer solution, the polymer can solidify, which form the PBI gel membrane. The PBI gel membrane can, in one embodiment, have a thickness of from about 15 μm to about 3000 μm, for instance from about 20 μm to about 2000 μm, or from about 20 μm to about 1500 μm, though any particular membrane thickness is not critical. In some embodiments, the PBI gel membrane can have a thickness that is less than that of the membrane precursor. As previously discussed, following hydrolysis, the PBI gel membrane can be self-supporting, even at high liquid content, which is believed to be due to the intra- and intermolecular polymer structures present in the solidified polymeric matrix.

The as-formed PBI gel membrane can, in one embodiment, have PBI solids content of from about 5 wt. % to about 40 wt. %, for instance from about 8 wt. % to about 30 wt. %, or from about 10 wt. % to about 25 wt. % of the total weight of the membrane including liquid content. The as-formed PBI gel membrane can be self-supporting, for instance having a Young's modulus of about 2.0 MPa or greater, for instance about 3.0 MPa or greater, or about 4.5 MPa or greater in some embodiments as determined for a PBI gel membrane having a thickness of 403 μm and a PBI content of 5 wt. % (e.g., polybenzimidazole).

While one obvious use of the method of the current disclosure is a redox flow battery membrane, the current method is not just limited to this facet and may be employed to produce not only PBI films, but fibers, fibrids, resins, resin beads, papers, microporous resin, sizing, coatings and molding resins. Further, PBI films of the current disclosure may be used in aerospace structures, adhesives, carbon fiber laminates, insulation, syntactic foams, and fabrics. Specific applications include, but are not limited to, aircraft seal fire blocking, protective firefighting gear, sock hoods, high-temperature gloves, aluminized crash rescue gear, flight suits, hazardous work coveralls, filtration systems, glass handling belts, expansion joints, gaskets, packings, resin filler, motor insulation, filament wound composites, lacing for reinforcement fibers, chopped fiber reinforcement for resin matrices, acid scavenger applications, sizings, heat shields, transformer wrap, asbestos replacement, composites, battery separators, tubular insulation, microelectronics processing, wire coatings, gas separation films, protective window and glass coatings, high-temperature substrate films, etc.

Optionally, the PBI gel membrane can be crosslinked, which can decrease the permeability of the membrane to redox pair ions of the battery electrolyte solutions without strongly affecting the desirable electrochemical characteristics of the membranes. The manner of crosslinking, as well as the point in the formation process at which the membrane is crosslinked, is not particularly limited. For instance, the gel membrane can be crosslinked following rinsing/washing of the as-formed gel membrane and prior to imbibing of the membrane with a supporting electrolyte. In other embodiments, however, the membrane can be crosslinked prior to rinsing/washing or following imbibing of the membrane with the supporting electrolyte.

In one embodiment, the PBI gel membrane can be crosslinked simply by heating in the presence of atmospheric oxygen. Crosslinking can also be affected by the action of radiation, e.g., infrared (IR) radiation (having a wavelength of from about 700 nm to about 1 mm) including near IR (radiation having a wavelength of from about 700 to about 2000 nm or an energy in the range from about 0.6 to about 1.75 eV).

To effect crosslinking, the PBI polymer can incorporate reactive functionality on the polymer chains so as to crosslink with itself, or alternatively, in conjunction with a crosslinking agent, i.e., a polyfunctional compound that can react with one or more functionalities of the PBI polymer (e.g., amines). Crosslinking agents can include any suitable functionality to effect crosslinking. Suitable crosslinking agents are not particularly limited, examples of which can include, without limitation, epichlorohydrin, diepoxides, diisocyanates, $\alpha,\omega$-dihaloalkanes, diacrylates, and bisacrylamides, particular examples of which can include, without limitation, $\alpha,\alpha'$-dichloro-p-xylene, chloromethyl methyl ether, bis(chloromethyl) ether, terephthaloyl chloride, succinyl chloride, and dimethyl succinate, as well as combinations of crosslinking agents. In one embodiment, from 1 to 20 equivalents of crosslinking agent can be utilized per available aromatic ring, but crosslinked embodiments of the membranes are not limited to any particular crosslink density.

Further, the PBI of the current disclosure can be imbibed with a supporting electrolyte. The supporting electrolyte of choice can generally depend upon the particular characteristics of the redox flow battery in which the membrane is to be employed, and can include acidic supporting electrolytes, basic supporting electrolytes, as well as neutral species (e.g., water). For instance, the membrane can be imbibed with a mineral acid (e.g., a strong inorganic acid) such as hydrochloric acid, nitric acid, fluorosulfonic acid, or sulfuric acid, or a mixture thereof, or a strong organic acid such as acetic acid, formic acid, p-toluene sulfonic acid, or trifluoromethane sulfonic acid or mixtures thereof as well as mixtures of different types of acids, e.g., a combination of a mineral acid and an organic acid. Other examples of supporting electrolytes that can be imbibed in the membrane can include, without limitation, sodium chloride, potassium chloride, sodium hydroxide, potassium hydroxide, sodium sulfide, potassium sulfide, and combinations thereof. By way of example, a supporting electrolyte can include $H_2SO_4$, HBr, HBr/HCl mixtures, HCl, $NaS_2$, $NaS_2$/NaBr mixtures, $Br_2$ in HBr, $Br_2$ in $H_2SO_4$, $Br_2$ in HBr/$H_2SO_4$ mixtures, etc. Tetraalkylammonium supporting cations can be imbibed in the membranes in one embodiment, with $Et_4N^+$ and $Bu_4N^+$ being two non-limiting examples. A solution of a tetrafluoroborate ($BF^{4-}$), perchlorate ($ClO^{4-}$), or hexafluorophosphate ($PF^{6-}$), or a combination thereof are additional examples of supporting electrolytes that can be imbibed in the membranes.

The concentration of the supporting electrolyte in the membrane is not particularly limited, and in general, a solution that is imbibed in the membranes can include the supporting electrolyte in a concentration of up to about 25 moles/liter (M), for instance from about 0.1 M to about 25 M, from about 0.5 M to about 10 M, or from about 1 M to about 5 M in some embodiments.

The film can be imbibed with the supporting electrolyte according to any suitable methodology. For example, the film can be imbibed with the supporting electrolyte, in one embodiment, by soaking the film in a solution of the supporting electrolyte for a period of time from a few minutes up to hours or days, optionally in an environment of increased temperature.

Figure 23:
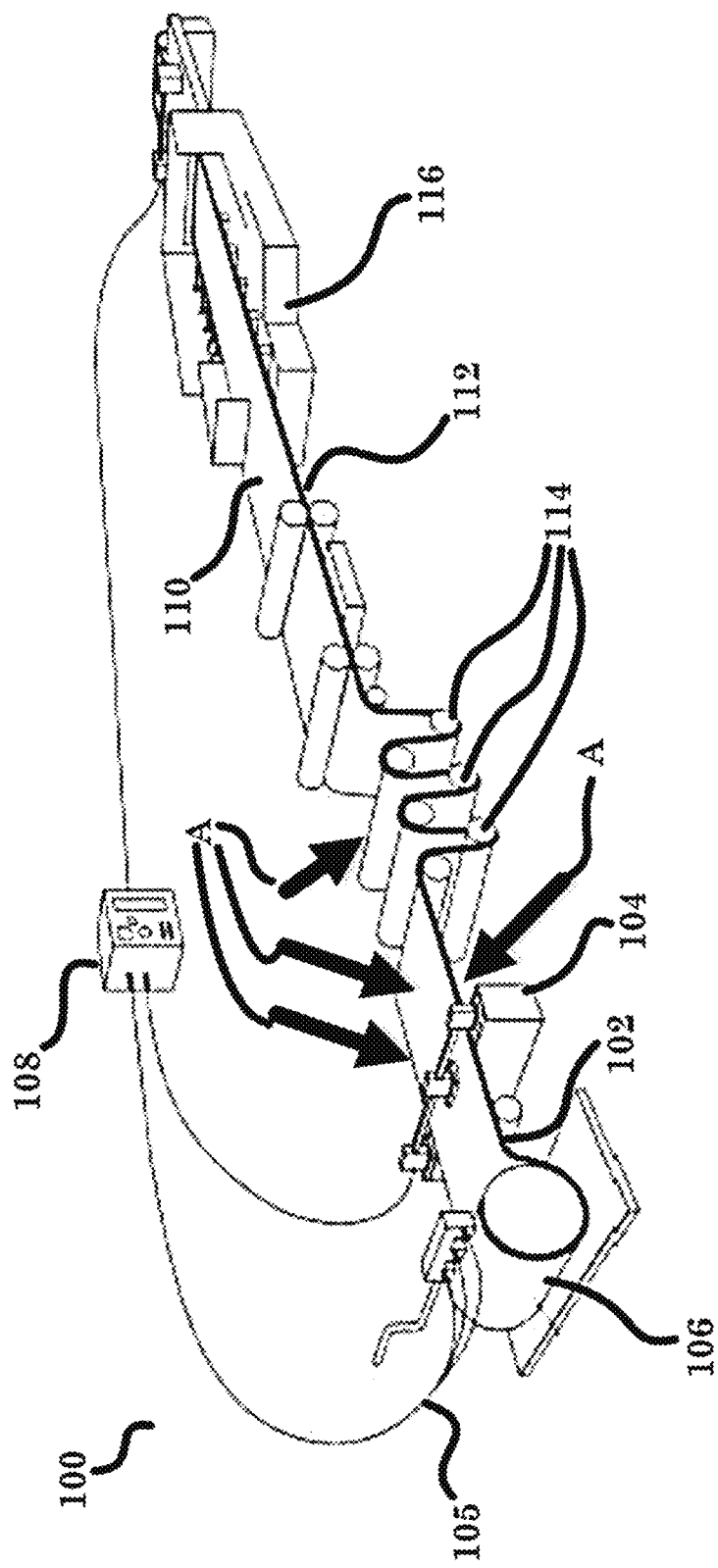
FIG. 23 shows a continuous PBI membrane formation process that may be used with the current disclosure.

While the examples (below) disclose placing the PBI gel membranes in contact with a substrate such as a porous sheet during the drying process. The substrate may include a variety of materials such as porous or non-porous substrates. In addition, the current disclosure discloses that the various PBI gels may be placed between two porous sheets, but also may be placed between a porous sheet and a non-porous sheet or only placed in contact with a porous or nonporous sheet without an opposing sheet on the other side of the PBI gel membrane. The membrane may also be dried in a continuous process with or without the use of a supporting sheet. Dry gas flows may be used on one or two sides of the supported or self-supporting membrane to promote the drying process, as shown in FIG. 23.

With respect to processing, the PBI membranes of the current disclosure may be restrained and/or tensioned in the X-, Y-, and Z-plane directions. Herein, "restrained" may be used to mean simply fastening a PBI membrane in place without placing a stretching or tensional force on the PBI membrane to stretch the membrane from its original shape. "Tensioning," meanwhile, may be used to mean applying a stretching or tensional force on the PBI membrane to render it taut across its surfaces in the X- and/or Y-plane directions or to increase its length in the X- and/or Y-plane directions. In a preferred embodiment, the PBI membrane is restrained and/or tensioned in the X- and Y-plane directions but left unrestrained and nontensioned in the Z-plane direction. Further, drying of the membrane may simply be allowing the PBI membrane to air dry. However, in a further embodiment, one may employ a gas feed directed onto a restrained or tensioned film, such as a dry gas, air, or nitrogen, to speed the drying process. Still further, the PBI film may be restrained in a width direction and dry gas, air, nitrogen passed over either one or both surfaces of the tensioned film.

The current disclosure also has a direct impact on film processing applications for PBI films formed pursuant to the current disclosure. In one embodiment, the current disclosure may be combined with continuous film making processes as known to those of skill in the art. For instance, as shown in FIG. 23, a continuous formation process 100 could be used to form a PBI membrane 102 via a continuous process whereby a pre-formed PBI membrane 102 may be directly deposited on a film tensioner surface 104, which may restrain the film in the X-, Y-, and/or Z-plane directions or may place tension by pulling PBI membrane 102 in the X-, Y-, and/or Z-plane directions, either simultaneously or separately. Or, instead, PBI membrane 102 may be applied as a solution 105 to a substrate surface 106, such as a quench drum, air roller, porous surface, etc., as known to those of skill in the art, to form PBI membrane 102. Additional steps may be added that submerge the cast solution and substrate into baths that contain a mixture of phosphoric acid and water that assist in the completion of the sol-gel process, and additionally, water baths that remove the phosphoric acid and replace it with water. Thus, the process of the current disclosure may accommodate both pre-formed and freshly formed PBI membranes 102 in a continuous assembly process, all under the direction of a controller 108. Drying gases, represented by arrows A, may be applied to PBI membrane top surface 110 and/or bottom surface 112 throughout process 100. Further, serpentine rolls 114 may be used to help tension, as well as allow for further drying, as PBI membrane 102 passes along the continuous formation process 100. After PBI membrane 102 is tensioned and dried, the membrane may be further processed 116 by cutting, rolling, etc., as known to those of skill in the art for processing PBI membrane 102.

The current disclosure provides many benefits to the PBI industry. Foremost, there is no use of organic solvents in the formation process. Second, the current disclosure opens avenues to work with PBI polymers that previously were of low interest for the very fact they could not be dissolved in organic solvents. The current process allows a wider variety of chemistries to be employed.

Further, the method of the current disclosure may be used to form films with thicknesses of 5-150 µm, more preferably 5-100 µm, and even more preferably, 10-50 µm.

The current disclosure details a novel process to making PBI films without using an organic solvent. Eliminating the need for an organic solvent offers a novel route to producing PBI films that is cheaper, less time consuming, and produces less chemical waste than previous methods. The new solventless process also allows for a wider range of PBI chemistries to be made into a film.

Use of the PBI-based films of the current disclosure is varied. The dry films can be further processed to "re-swell" the membrane to imbibe a base, an acid, or other ion conductors, in the film for use as an ion conductor in an electrochemical application; thus, the film is not limited to simply use in redox flow batteries. Upon re-swelling, the film exhibits a low permeability to redox couples, as well as other materials, and still exhibits a high ion conductivity for electrochemical applications.

The following examples better explain the current disclosure.

EXPERIMENTAL

Materials 3,3',4,4'-Tetraaminobiphenyl (TAB, polymer grade, ~97.5%) was donated by BASF Fuel Cell, Inc. and used as received. Monosodium 2-sulfoterephthalate (>98.00% purity) was purchased from TCI and used as received. Polyphosphoric acid (115%) was supplied from FMC Corporation and used as received. a,a'-Dichloro-p-xylene (>98.0% purity) was purchased from TCI and used as received.

Polymer Synthesis and Membrane Fabrication

A typical polymerization consisted of 10.71 g tetraaminobiphenyl (TAB, 50 mmol), and 13.44 g monosodium 2-sulfoterephthalate (s-TPA, 50 mmol) added to 580 g polyphosphoric acid, mixed with an overhead stirrer and purged with dry nitrogen. The contents were heated in a high-temperature silicone oil bath, and the temperature was controlled by a programmable temperature controller with ramp and soak features. In a typical polymerization, the final reaction temperature was approximately 195° C. and held for 12 hours. Once the reaction was completed, as determined by visual inspection of viscosity, the polymer solution was cast onto clear glass plates using a doctor blade with a controlled gate thickness of 15 mils. The cast solution was hydrolyzed into membranes in a humidity chamber regulated to 55% R.H. at 25° C.

Acid Exchange

Cast membranes were placed in DI water baths and the pH of the water was monitored using pH strips. Water baths were replaced every 8 hours until a pH of 7 was recorded. At this point the membrane was either placed into a 2.6 molar sulfuric acid bath for 24 hours to ensure equilibrium of acid doping, or the membrane was further modified by a crosslinking reaction.

Post-Membrane Formation Crosslinking

After PA removal from the PBI gel membranes, the membranes were allowed to soak in a bath of 0.0523 M solution of a,a'-dichloro-p-xylene in methanol. The bath was covered, heated to 30° C., and agitated with a magnetic stir bar. Crosslinking reactions were typically allowed to proceed for 6 hours. The membrane was then washed with DI water and methanol cyclically, at least three times. The membrane was then transferred to a 2.6 M sulfuric acid (SA) bath for 24 hours for acid doping.

Membrane Composition

The composition of sulfuric acid-doped PBI membranes was determined by measuring the relative amounts of polymer solids, water, and acid in the membranes. The SA content of a membrane was determined by titrating a membrane sample with standardized sodium hydroxide solution (0.10 M) using a Metrohm 888 DMS Titrando Autotitrator. Once titrated, the sample was thoroughly washed with DI water and dried at reduced pressures at 120° C. overnight. The dried sample was then weighed to determine the polymer solids content of the membrane.

Using Equations 1 and 2, the polymer weight percentage and sulfuric acid weight percentage can be determined, respectively:

$$\text{Polymer } w/w\% = \frac{W_{dry}}{W_{sample}} \cdot 100 \tag{1}$$

$$\text{Acid } w/w\% = \frac{M_{acid} \cdot V_{NaOH} \cdot c_{NaOH}}{w \cdot W_{sample}} \tag{2}$$

where $W_{sample}$ is the weight of the sample before titration, $W_{dry}$ is the weight of final dried sample after titration, $M_{acid}$ is the molecular weight of sulfuric acid, and $V_{NaOH}$ and $c_{NaOH}$ are the volume and concentration of the sodium hydroxide solution required to neutralize the sulfuric acid to the first equivalence point. It is important to note that even though the second proton of sulfuric acid is much less acidic than the first, it is still a strong enough acid to cause both protons to be titrated simultaneously, $pK_{a1}=-3$ and $pK_{a2}=2$.

The number of moles of sulfuric acid per mole of PBI repeat unit (or the SA doping levels, X) were calculated from the equation:

$$X = \frac{V_{NaOH} \cdot c_{NaOH}}{2 \cdot W_{dry} / M_{polymer}} \tag{3}$$

where $V_{NaOH}$ and $c_{NaOH}$ are the volume and concentration of the sodium hydroxide solution required to neutralize the sulfuric acid to the first equivalence point, $W_{dry}$ is the final weight of the dried sample after titration, and $M_{polymer}$ is the molecular weight of the polymer repeat unit.

Conductivity

The membranes were imbibed with sulfuric acid and $V^{4+}$ ions by immersion in 2.6 M sulfuric acid and 1.5 M $VOSO_4$+2.6 M sulfuric acid solution respectively. In-plane conductivity of the membrane was measured by a four-probe electrochemical impedance spectroscopy (EIS) method using a HORIBAFuelCon (TrueData-EIS PCM) electrochemical workstation over the frequency range from 1 Hz to 50 kHz. A membrane sample with a typical geometry of 1.0 cm×4.0 cm was fixed into the measuring 4-electrode head of the measurement. The conductivity of the membrane was calculated using the following equation:

$$\sigma = \frac{d}{l \cdot w \cdot R_m} \tag{4}$$

Where d is the distance between the two inner probes, l is the thickness of the membrane, w is the width of the membrane, and $R_m$ is the ohmic resistance determined by the model fitting. Conductivities were conducted at room temperature to replicate normal operating conditions of VRFBs.

Vanadium Permeability

The crossover of vanadium ($VOSO_4$) was measured utilizing a PermeGear® "side-by-side" direct permeation cell. The cell has two chambers with a 45 mL volume separated by the membrane under test. The temperature of the chambers was regulated at 25° C. with a recirculating water bath. A typical test experiment contained 1.5 M $VOSO_4$ in 2.6 M sulfuric acid in the donor chamber and 1.5 M $MgSO_4$ in 2.6 M sulfuric acid in the receptor chamber. Vanadium has a strong absorption characteristic at 248 nm; utilizing this property, the concentration of the receptor chamber was measured with a Shimadzu UV-2450 UV/Vis Spectrometer at various time intervals. The $VO^{2+}$ permeability can be calculated using Fick's diffusion law, equation 5, $$P_s t = \ln\left[1 - 2\frac{c_r(t)}{c_r(0)}\right]\left[-\frac{Vd}{A}\right] \qquad (5)$$

where: $c_r(t)$ is the receptor $VOSO_4$ concentration at time t, $c_r(0)$ is the donor initial $VOSO_4$ concentration, V is the donor and receptor solution volume, d is the membrane thickness, A is the active area of the membrane, and $P_s t$ is the salt permeability.

Example 1: Para-PBI, Stretching Ratio=1.7 para-PBI membrane made by the PPA process was first rinsed in a series of deionized water baths to remove phosphoric acid. pH indication paper was used to ensure all the acid had been removed before proceeding. The membrane was cut to dimensions of 10 cm×12 cm and folded twice into four layers. The membrane was stretched to 1.7 times its original length using an Instron 5843 Tensile Tester. It was then placed between two porous glass plates, clamped down around the perimeter to maintain the x-y dimensions and left to dry overnight. The following day, the dried, dense PBI film was removed and placed in a solution of 2.6 M sulfuric acid for 24 hours before characterization. In-plane ionic conductivity was measured at room temperature to be 175 mS/cm.

Vanadium ($VOSO_4$) crossover was measured using a PermeGear® "side-by-side" direct permeation cell. The cell contains two 45 mL volume chambers separated by the membrane sample. The test temperature was controlled to 25° C. with a recirculating water bath. The test experiment contained 1.5 M $VOSO_4$ in 2.6 M sulfuric acid in the donor chamber and 1.5 M MgSO4 in 2.6 M sulfuric acid in the receptor chamber. Vanadium (IV) concentration in the receptor chamber was measured by absorbance at 248 nm with a Shimadzu UV-2450 UV/Vis Spectrometer at various time intervals. The VO2+ permeability was then calculated using Fick's diffusion law:

$$P_s t = \ln\left[1 - 2\frac{c_r(t)}{c_r(0)}\right]\left[-\frac{Vd}{A}\right]$$

where $c_r(t)$ is the concentration of $VOSO_4$ in the receptor chamber at time t, $c_r 0$ is the initial concentration of $VOSO_4$ in the donor chamber, V is the solution volume in the donor and receptor chambers, d is the membrane thickness, A is the active area of the membrane, and $P_s$ is the salt permeability. The $VOSO_4$ permeability was measured to be $1.93 \times 10^{-8}$ cm$^2$/s.

Figure 12:
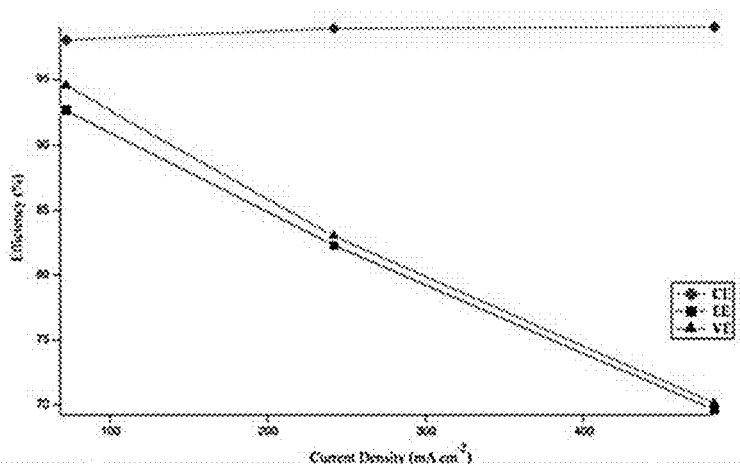
FIG. 12 shows change in voltage efficiency (VE), coulombic efficiency (CE), and energy efficiency (EE) with change in current density for 1.7× stretched para-PBI.

A VRFB test cell was assembled with an active area of 24 cm$^2$ and utilized with interdigitated flow fields for liquid electrolyte solutions machined into carbon plates. The membrane was sandwiched between identical commercial carbon paper electrodes that were heat treated to 400° C. for 30 hours in air, and gasketed with polytetrafluoroethylene (PTFE) films. The cell was equipped with two reservoirs of 100 mL electrolyte solution per side consisting of 1.60 M vanadium species having 3.55 average oxidation state and 4.2 M total sulfur content. The electrolytes were circulated though the cell at a constant flow rate of 120 mL/min by two acid-resistant diaphragm pumps. The charge/discharge cycling performance was measured at constant current densities ranging from 72 mA/cm$^2$ to 484 mA/cm$^2$ using a multi-channel Potentiostat (Model BT2000, Arbin Instruments Inc., College Station, Tex.). The VE, CE and EE were measured and recorded, see FIG. 12.

Example 2: Para-PBI, Stretching Ratio=1.5 para-PBI membrane made by the PPA process was first rinsed in a series of deionized water baths to remove phosphoric acid. pH indication paper was used to ensure all the acid had been removed before proceeding. Next, the neutralized membrane was cut to be 10 cm×12 cm and folded twice into four layers. The membrane was stretched to 1.5 times its original length using an Instron 5843 Tensile Tester. It was then placed between two porous glass plates, clamped down around the perimeter to maintain the x-y dimensions and left to dry overnight. The following day, the dried, dense PBI film was removed and placed in a solution of 2.6 M sulfuric acid for 24 hours before characterization. In-plane ionic conductivity was measured at room temperature to be 207.6 mS/cm. $VOSO_4$ permeability was tested as described in Example 1 and found to be $4.55 \times 10^{-8}$ cm$^2$/s.

Figure 13:
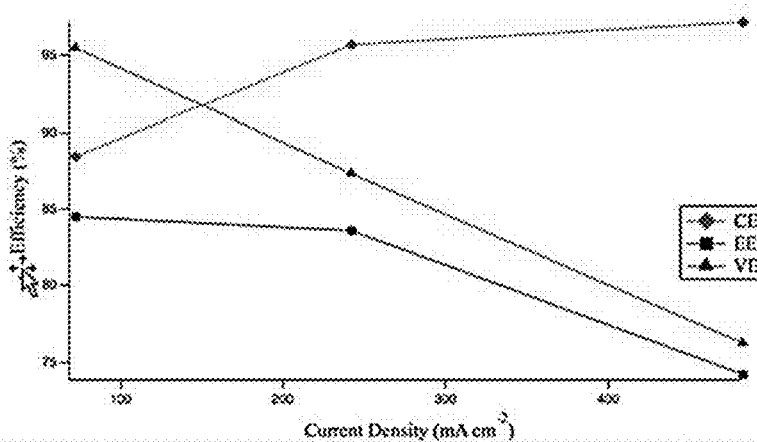
FIG. 13 shows change in voltage efficiency (VE), coulombic efficiency (CE) and energy efficiency (EE) with change in current density for 1.5× stretched para-PBI.

A VRFB test cell was assembled as described herein. The VE, CE, and EE were measured and recorded, see FIG. 13.

Example 3: Para-PBI, Stretching Ratio=0 para-PBI membrane made by the PPA process was first rinsed in a series of deionized water baths to remove phosphoric acid, using pH indication paper to ensure all the acid had been removed before proceeding. The wet thickness was measured to be 356.67±5.8 μm, and membrane dimensions were cut to 45.72 cm×30.48 cm. The wet membrane was placed between two porous polyethylene sheets and clamped along the perimeter to maintain the x-y dimensions. The sandwiched membrane was left upright on the benchtop at room temperature to dry. After 24 hours, the clamps and porous sheets were removed, revealing a dried, dense PBI film. The film had a uniform thickness of 30 μm.

Example 3A: Doped in 2.6M SA Flow Battery Data

The dry film was placed in 2.6 M sulfuric acid for 24 hours before characterization. In-plane ionic conductivity was measured at room temperature to be 95.17 mS/cm. $VOSO_4$ permeability was tested as described in Example 1 and measured to be $2.65 \times 10^{-8}$ cm$^2$/s.

Figure 14:
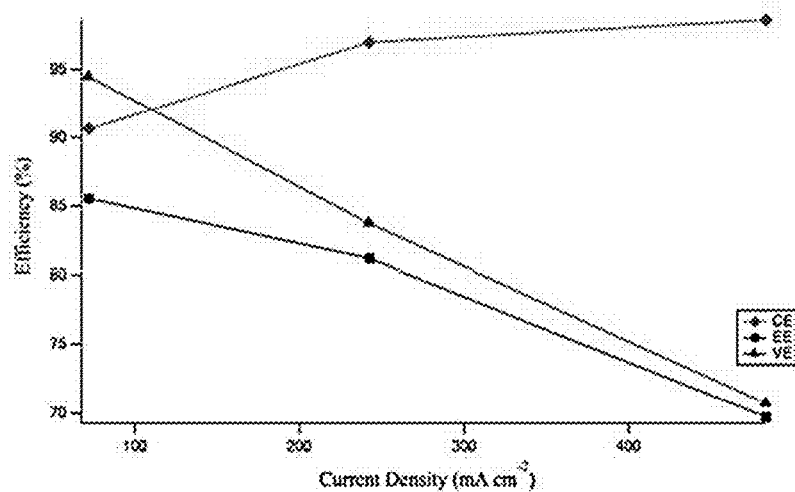
FIG. 14 shows change in voltage efficiency (VE), coulombic efficiency (CE), and energy efficiency (EE) with change in current density for dried para-PBI.

A VRFB test cell was assembled as described in Example 1. The VE, CE, and EE were measured and recorded, see FIG. 14.

Example 3B: Doped in 85 wt. % Phosphoric Acid

The dry film was placed in 85 wt. % phosphoric acid for 24 hours before characterization. Through-plane ionic conductivity was measured by a four-probe AC impedance spectroscopy method using a Zahner IM6e Spectrometer over a frequency range of 1 Hz to 100 kHz with an amplitude of 5 mV. A two-component model with an ohmic resistance in parallel with a capacitor was employed to fit the experimental data. The conductivities of the membrane at different temperatures were calculated from the membrane resistance obtained from the model simulation, using the following equation:

$$\sigma = \frac{d}{lwR_\Omega}$$

where d is the distance between the two inner probes, l is the membrane thickness, w is the membrane width, and $R_\Omega$ is the ohmic resistance determined by model fitting. The membrane sample was subjected to two heating ramps to 180° C. The conductivity measured at 180° C. on the second heat ramp was 215.68 mS/cm.

Example 4: s-PBI, Stretching Ratio=1.5

11.0824 g of 3,3',4,4'-tetraaminobiphenyl (TAB, 51.72 mmol), 13.9034 g of 2-sulfoterephthalic acid monosodium salt (2STPA, 51.85 mmol) and 600 g of polyphosphoric acid (PPA) were added to 1000 mL reaction kettle (4 wt. % monomer charge) equipped with an overhead mechanical stirrer. The polymerization was conducted for 48 hours in a nitrogen atmosphere at 220° C. The solution was applied to a glass substrate by means of a doctor blade with a 20-mil gate thickness and subsequently hydrolyzed for 24 hours. The s-PBI membrane imbibed in phosphoric acid was rinsed in a series of deionized water baths to remove phosphoric acid. pH indication paper was used to ensure all the acid had been removed before proceeding. It was cut to dimensions of 10 cm×12 cm and folded twice into four layers. The membrane was stretched to 1.5 times its original length using an Instron 5843 tensile tester. It was then placed between two porous glass plates, clamped along the perimeter to maintain the x-y dimensions and left to dry overnight. The following day, the dried, dense PBI film was removed and placed in a solution of 2.6 M sulfuric acid for 24 hours before characterization. In-plane ionic conductivity was measured at room temperature to be 179.7 mS/cm. $VOSO_4$ permeability was tested as described in Example 1 and measured to be $2.60\times10^{-9}$ $cm^2/s$.

Figure 15:
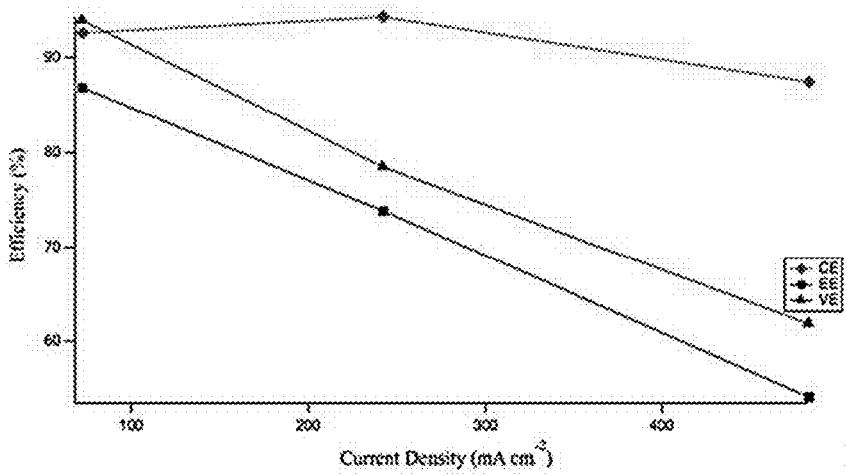
FIG. 15 shows change in voltage efficiency (VE), coulombic efficiency (CE), and energy efficiency (EE) with change in current density for stretched s-PBI.

A VRFB test cell was assembled as described in Example 1. The VE, CE, and EE were measured and recorded, see FIG. 15.

Example 5: s-PBI, Stretching Ratio=0

11.0824 g of 3,3',4,4'-tetraaminobiphenyl (TAB, 51.72 mmol), 13.9034 g of 2-sulfoterephthalic acid monosodium salt (2STPA, 51.85 mmol) and 600 g of polyphosphoric acid (PPA) were added to 1000 mL reaction kettle (4 wt. % monomer charge) equipped with an overhead mechanical stirrer. The polymerization was conducted for 48 hours in a nitrogen atmosphere at 220° C. The solution was applied to a glass substrate by means of a doctor blade with a 20-mil gate thickness and subsequently hydrolyzed for 24 hours. The s-PBI membrane imbibed in phosphoric acid was rinsed in a series of deionized water baths to remove phosphoric acid. pH indication paper was used to ensure all the acid had been removed before proceeding. The wet thickness was measured to be 251.8±34 µm. The wet membrane was placed between two porous polyethylene sheets, clamped along the perimeter to maintain the x-y dimensions and left to dry overnight. After 24 hours, the clamps and porous sheets were removed, revealing a dried, dense PBI film. The film had a uniform thickness of 37.7 µm. The dry film was placed in 2.6 M sulfuric acid for 24 hours before characterization. In-plane ionic conductivity was measured at room temperature to be 65.71 mS/cm. $VOSO_4$ permeability was tested as described herein and was measured to be $7.76\times10^{-9}$ $cm^2/s$.

Figure 16:
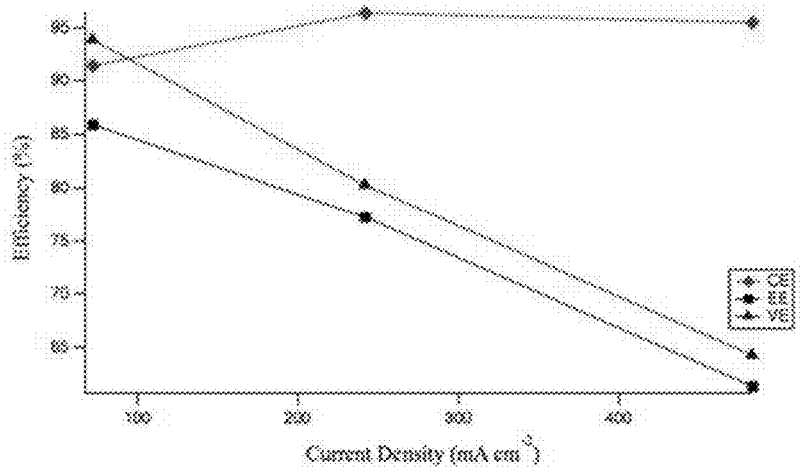
FIG. 16 shows change in voltage efficiency (VE), coulombic efficiency (CE), and energy efficiency (EE) with change in current density for dried s-PBI.

A VRFB test cell was assembled as described herein. The VE, CE, and EE were measured and recorded, see FIG. 16.

Example 6: Di-OH-PBI, Stretching Ratio=0

6.615 g of 3,3',4,4'-tetraaminobiphenyl (TAB, 30.87 mmol), 6.119 g of 2,5-dihydroxyterephthalic acid (DiOH-TPA, 30.88 mmol), and 401.29 g of polyphosphoric acid (PPA) were added to a reaction kettle and stirred under a nitrogen atmosphere with an overhead mechanical stirrer. The polymerization was conducted for 24 hours in a nitrogen atmosphere at 220° C. The solution was applied to a glass substrate by means of a doctor blade with a 20-mil gate thickness and subsequently hydrolyzed for 24 hours. The membrane imbibed in phosphoric acid was rinsed in a series of deionized water baths to remove phosphoric acid. pH indication paper was used to ensure all the acid had been removed before proceeding. The wet thickness was measured to be 404.44±10 µm. The wet membrane was placed between two porous polyethylene sheets, clamped along the perimeter to maintain the x-y dimensions and left to dry overnight. After 24 hours, the clamps and porous sheets were removed, revealing a dried, dense PBI film. The film had a uniform thickness of 31.1 µm. The dry film was placed in 2.6 M sulfuric acid for 24 hours before characterization. In-plane ionic conductivity was measured at room temperature to be 218.48 mS/cm. $VOSO_4$ permeability was tested as described herein and measured to be $3.92\times10^{-8}$ $cm^2/s$.

Comparative Example 1 (Gel Para-PBI)

para-PBI membrane made by the PPA process was first rinsed several times in deionized water baths to remove phosphoric acid. pH indication paper was used to ensure all the acid had been removed before proceeding. The neutralized membrane was then placed in a solution of 2.6 M sulfuric acid for at least 24 hours before characterization. $VOSO_4$ permeability was tested as described herein and measured to be $5.73\times10^{-7}$ $cm^2/s$.

Comparative Example 2 (Gel s-PBI)

11.0824 g of 3,3',4,4'-tetraaminobiphenyl (TAB, 51.72 mmol), 13.9034 g of 2-sulfoterephthalic acid monosodium salt (2STPA, 51.85 mmol) and 600 g of polyphosphoric acid (PPA) were added to 1000 mL reaction kettle (4 wt. % monomer charge) equipped with an overhead mechanical stirrer. The polymerization was conducted for 48 hours in a nitrogen atmosphere at 220° C. The solution was applied to a glass substrate by means of a doctor blade with a 20-mil gate thickness and subsequently hydrolyzed for 24 hours. The s-PBI membrane imbibed in phosphoric acid was rinsed in a series of deionized water baths to remove phosphoric acid. pH indication paper was used to ensure all the acid had been removed. The s-PBI membrane was placed in 2.6 M sulfuric acid for 24 hours before characterization. $VOSO_4$ permeability was tested as described herein and measured to be $4.89 \times 10^{-7}$ $cm^2/s$.

Comparative Example 3 (Gel Di-OH-PBI)

6.615 g of 3,3',4,4'-tetraaminobiphenyl (TAB, 30.87 mmol), 6.119 g of 2,5-dihydroxyterephthalic acid (diOH-TPA, 30.88 mmol), and 401.29 g of polyphosphoric acid (PPA) were added to a reaction kettle and stirred under a nitrogen atmosphere with an overhead mechanical stirrer. The polymerization was conducted for 24 hours in a nitrogen atmosphere at 220° C. The solution was applied to a glass substrate by means of a doctor blade with a 20-mil gate thickness and subsequently hydrolyzed for 24 hours. The membrane imbibed in phosphoric acid was rinsed in a series of deionized water baths to remove phosphoric acid. pH indication paper was used to ensure all the acid had been removed. The membrane was placed in 2.6 M sulfuric acid for 24 hours before characterization. $VOSO_4$ permeability was tested as described in Example 1 and measured to be $7.23 \times 10^{-7}$ $cm^2/s$.

Comparative Example 4 (Meta-PBI)

Commercially available meta-PBI film, prepared from casting and drying N,N-dimethylacetamide solutions, was used as received. The film was placed in a solution of 2.6 M sulfuric acid for 24 hours before characterization. In-plane ionic conductivity was measured at room temperature to be 13.1 mS/cm.

Figure 17:
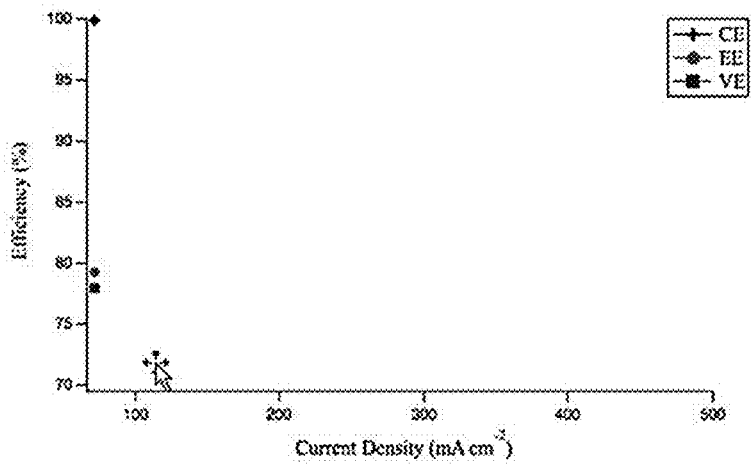
FIG. 17 shows change in voltage efficiency (VE), coulombic efficiency (CE), and energy efficiency (EE) with change in current density for a vanadium redox flow battery (VRFB) test cell as described in Example 1, which includes a conventionally imbibed dense m-PBI.

A VRFB test cell was assembled as described in Example 1. The VE, CE, and EE were measured at 72 $mA/cm^2$ and recorded, see FIG. 17. At higher current densities, the cell had no practical performance and could not be operated. This is because voltage is related to the membrane conductivity, which is very low for this membrane.

Example 7: Para-PBI Film para-PBI membrane made by the PPA process was first rinsed in a wash, the wash may comprise various solutions including slightly basic water, deionized water, or other appropriate washes as known to those of skill in the art, in one embodiment the wash may be a series of deionized water baths to remove phosphoric acid, using pH indication paper to ensure all the acid had been removed before proceeding. The wet thickness was measured to be 356.67±5.8 μm, and membrane dimensions were cut to 45.72 cm×30.48 cm. The wet membrane was placed between two porous polyethylene sheets, clamped down around the perimeter to maintain the x-y dimensions and left to dry overnight. After 24 hours, the polyethylene sheets were removed, revealing a dried, dense PBI film. The film had a uniform thickness of 30 μm. The film had greater than 85 wt. % remaining at 500° C. in a nitrogen atmosphere, measured by thermogravimetric analysis (TGA).

Figure 18:
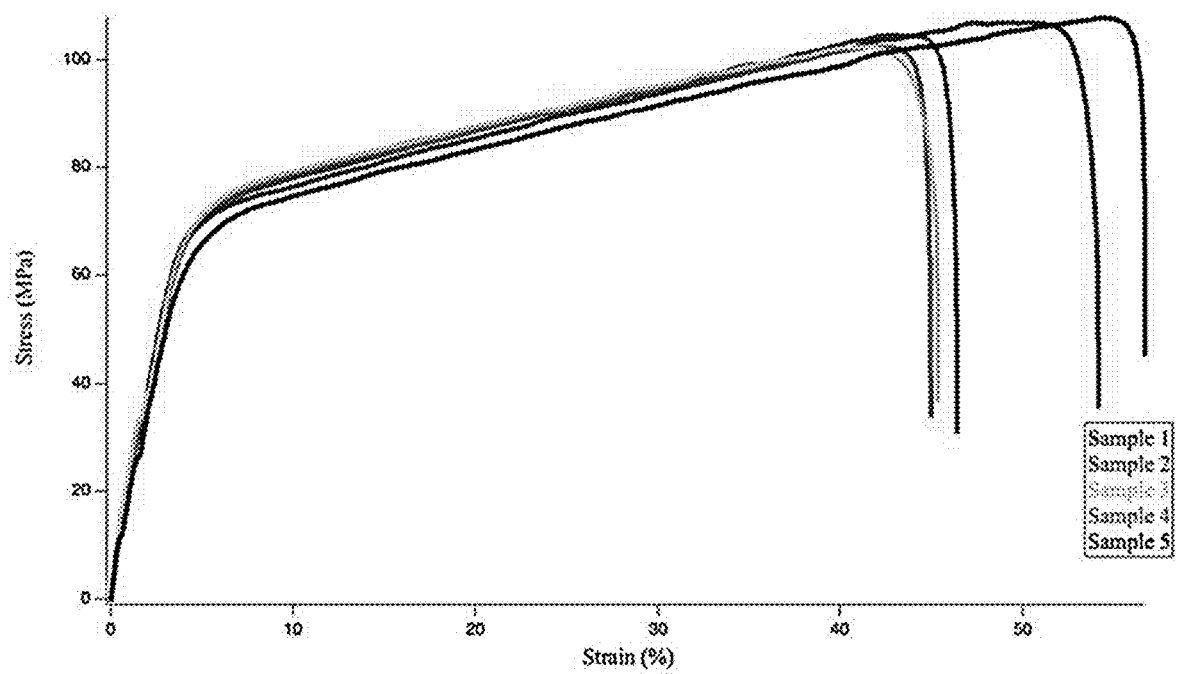
FIG. 18 shows mechanical properties of a para-PBI film formed via the PPA process and treated via the process of the current disclosure.

Mechanical properties of the dense film were measured with an Instron 5843 Tensile Tester. Five samples were cut according to ASTM D638 (type V) specifications and the modulus (taken as the slope at 1% strain), stress at break, and strain at break were measured. FIG. 18 shows tensile testing results of para-PBI membrane made pursuant to the current disclosure.

Example 8: Di-OH-PBI Film 401.30 g of polyphosphoric acid was added to a reaction kettle charged with 6.6161 g (30.88 mmol) of 3,3',4,4'-tetraaminobiphenyl and 6.1177 g (30.88 mmol) of 2,5-dihydroxyterephthalic acid. While stirring under a nitrogen atmosphere, the polymerization began at 40° C. for 1 hour, ramped to 140° C. for 2 hours, soaked at 140° C. for 4 hours, ramped to 195° C. for 3 hours, and soaked at 195° C. for 14 hours. The solution was then applied by means of a doctor blade onto a polyester film and subsequently hydrolyzed at room temperature and 55% relative humidity.

The Di-OH-PBI membrane was then rinsed in a series of deionized water baths to remove phosphoric acid, using pH indication paper to ensure all the acid had been removed before proceeding. The wet thickness was measured to be 348.33±43.4 μm. The wet membrane was placed between two porous polyethylene sheets, clamped down around the perimeter to maintain the x-y dimensions and left to dry overnight. After 24 hours, the polyethylene sheets were removed, revealing a dried, dense PBI film. The film had a thickness of 24.67±3.8 μm.

Figure 19:
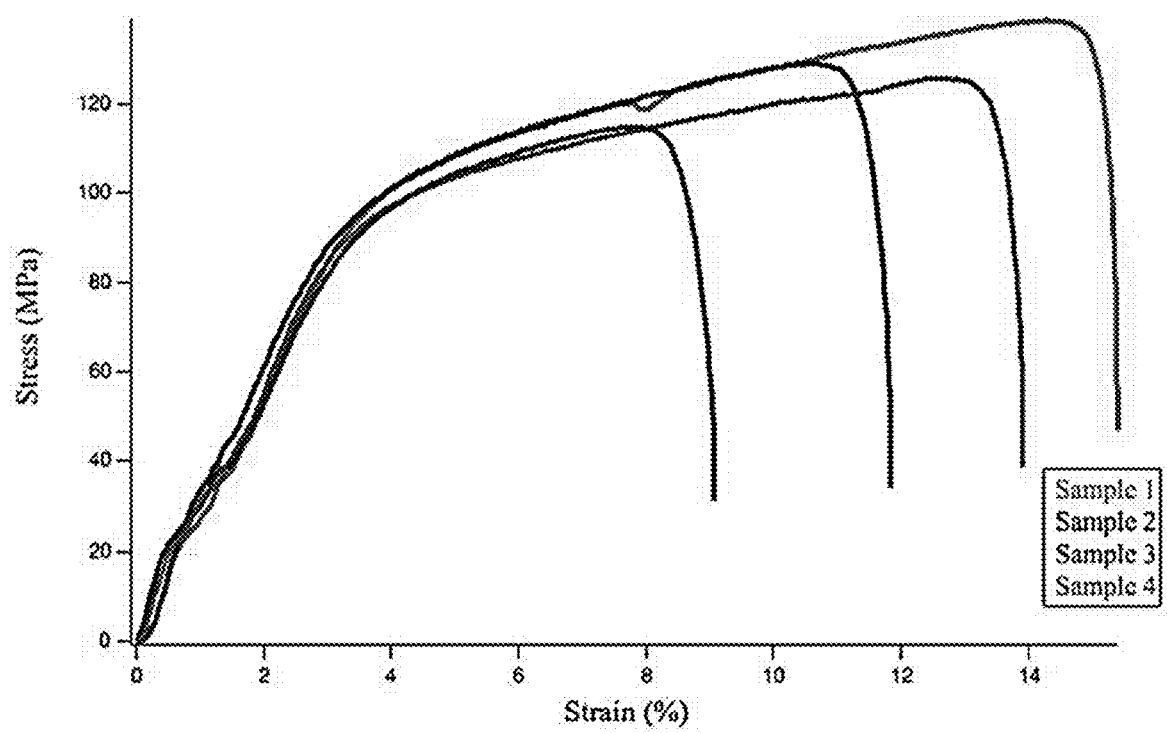
FIG. 19 shows mechanical properties of a PBI film formed pursuant to the current disclosure.

Mechanical properties of the dense film were measured with an Instron 5843 Tensile Tester. Four samples were cut according to ASTM D638 (type V) specifications and the modulus (taken as the slope at 1% strain), stress at break, and strain at break were measured, see FIG. 19.

Example 9: s-PBI Film 384 g of polyphosphoric acid was added to a reaction kettle charged with 7.1063 g (33.17 mmol) of 3,3',4,4'-tetraaminobiphenyl and 8.8937 g (33.16 mmol) of 2-sulfoterephthalic acid monosodium salt. While stirring under a nitrogen atmosphere, the polymerization proceeded at 190° C. for 48 hours. The solution was then applied by means of a doctor blade onto a polyester film and subsequently hydrolyzed at room temperature and 55% relative humidity.

The s-PBI membrane was then rinsed in a series of deionized water baths to remove phosphoric acid, using pH indication paper to ensure all the acid had been removed before proceeding. The wet thickness was measured to be 276.33±22.59 μm. The wet membrane was placed between two porous polyethylene sheets, clamped down around the perimeter to maintain the x-y dimensions and left to dry overnight. After 24 hours, the polyethylene sheets were removed, revealing a dried, dense PBI film. The film had a thickness of 33.0±3.0 μm.

Figure 20:
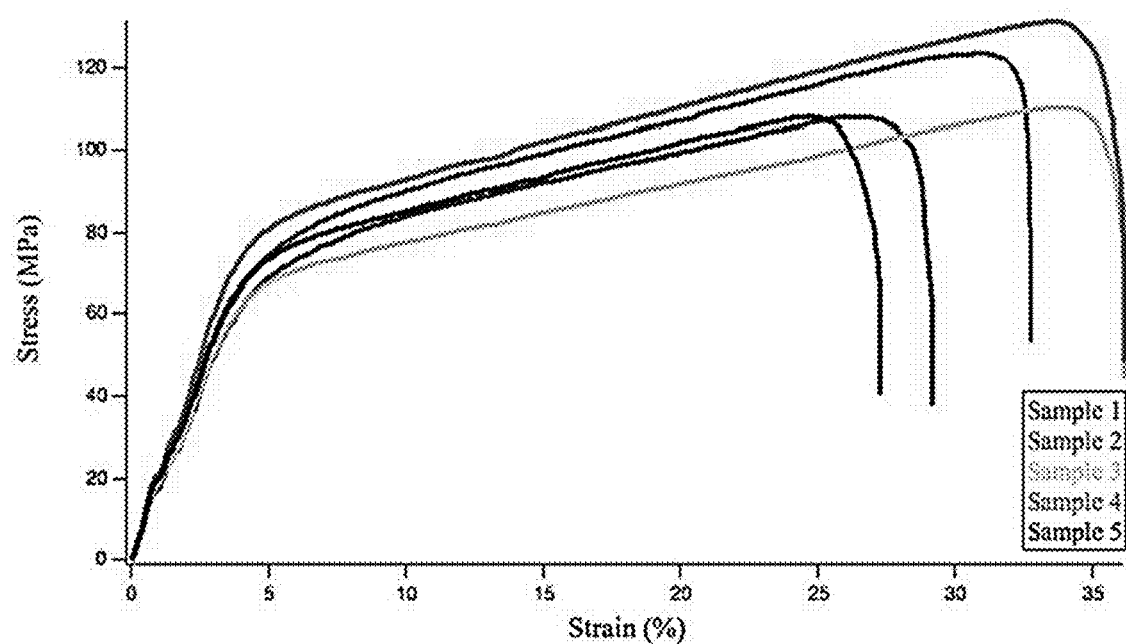
FIG. 20 shows mechanical properties of a s-PBI copolymer film formed pursuant to the current disclosure.

Mechanical properties of the dense film were measured with an Instron 5843 Tensile Tester. Five samples were cut according to ASTM D638 (type V) specifications and the modulus (taken as the slope at 1% strain), stress at break, and strain at break were measured, see FIG. 20.

Example 10: Meta/Para-PBI Copolymer Film 1027 g of polyphosphoric acid was added to a reaction kettle charged with 64.2810 g (300.00 mmol) of 3,3',4,4'-tetraaminobiphenyl, 43.6118 g (262.52 mmol) of isophthalic acid, and 6.2303 g (37.50 mmol) of terephthalic acid. While stirring under a nitrogen atmosphere, the mixture was polymerized at 190° C. for 20 hours. The solution was then applied by means of a doctor blade onto a polyethylene film and subsequently hydrolyzed at room temperature and 55% relative humidity.

The meta/para-PBI copolymer membrane was then rinsed in a series of deionized water baths to remove phosphoric acid, using pH indication paper to ensure all the acid had been removed before proceeding. The wet thickness was measured to be 197±15.70 μm. The wet membrane was placed between two porous polyethylene sheets, clamped down around the perimeter to maintain the x-y dimensions and left to dry overnight. After 24 hours, the polyethylene sheets were removed, revealing a dried, dense PBI film. The film had a thickness of 62.67±7.97 μm.

Figure 21:
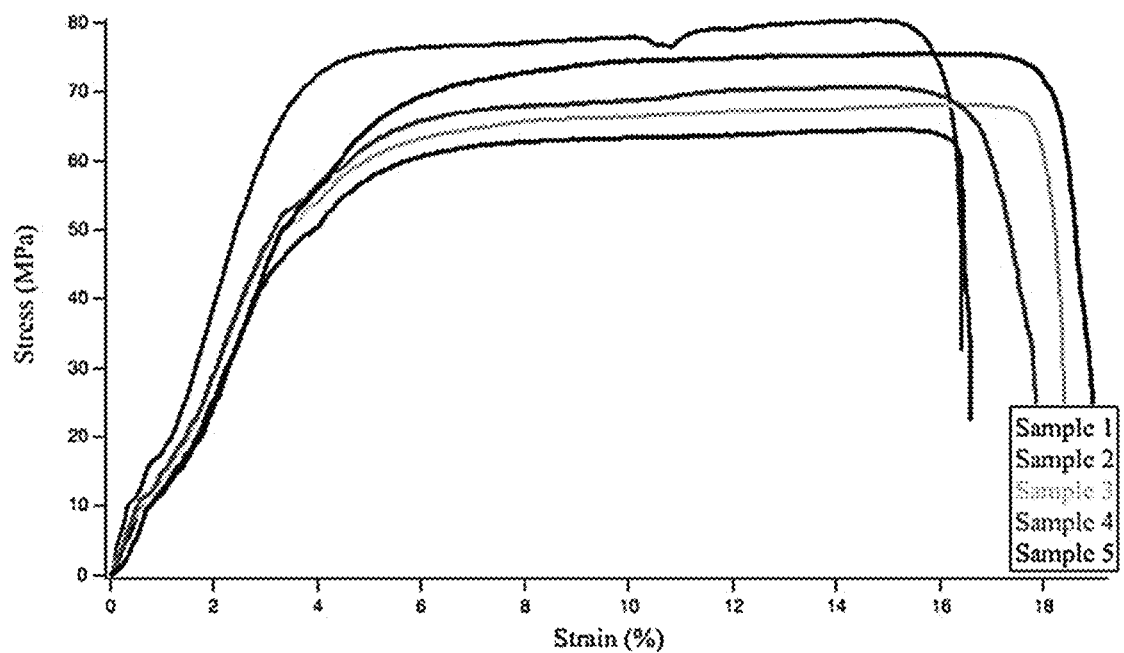
FIG. 21 shows mechanical properties of a meta-/para-PBI copolymer film formed pursuant to the current disclosure.

Mechanical properties of the dense film were measured with an Instron 5843 Tensile Tester. Five samples were cut according to ASTM D638 (type V) specifications and the modulus (taken as the slope at 1% strain), stress at break, and strain at break were measured, see FIG. 21.

Example 11: Para-PBI Film Dried with One Support Substrate

In this example, a para-PBI membrane made by the PPA process was first rinsed in a series of deionized water baths to remove phosphoric acid, using pH indication paper to ensure all the acid had been removed before proceeding. The wet thickness was measured to be 350 μm. The wet membrane was clamped onto a single support substrate, one porous polyethylene sheet, to maintain the x-y dimensions and left to dry. After 8 hours, a dried, dense PBI film remained, which was removed from the porous polyethylene sheet. The film was 42 μm thick, observed to be of high quality, and appeared to be consistent with the film produced in Example 1, supra.

Comparative Example 5: Commercial Meta-PBI Film Cast from Organic Solvent

Figure 22:
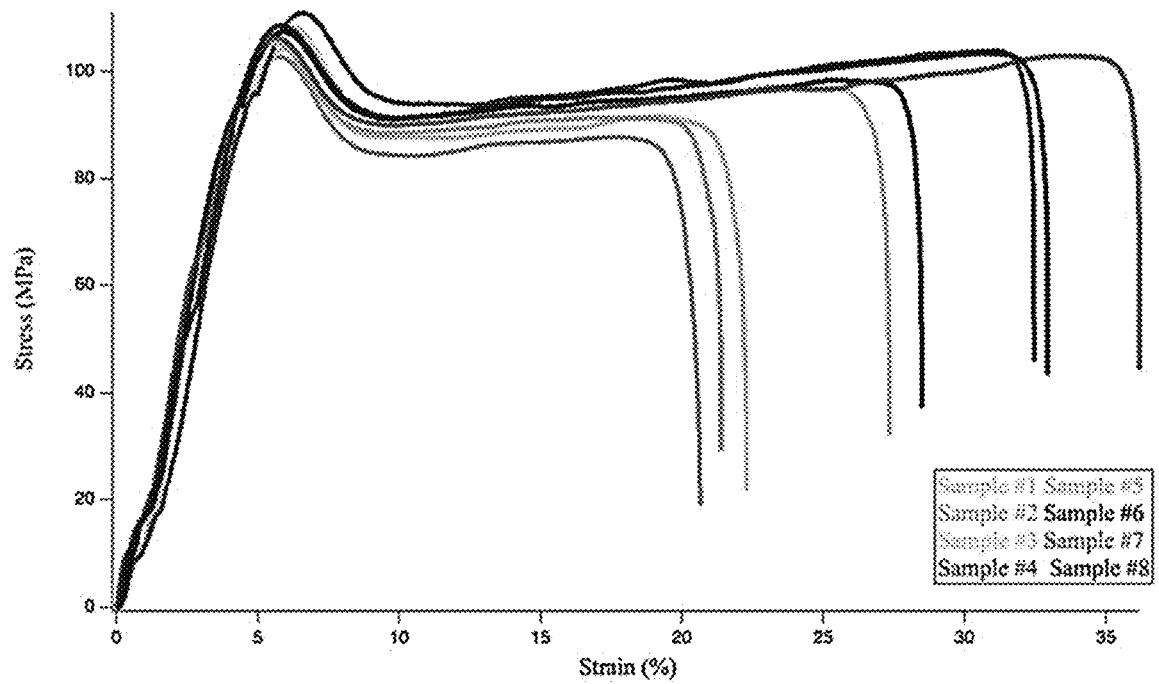
FIG. 22 shows mechanical properties of a comparative example using organic solution cast m-PBI.

Solution cast (from N,N-dimethylacetamide) m-PBI was obtained commercially and used as received. Mechanical properties of the dense film were measured with an Instron 5843 Tensile Tester. Eight samples were cut according to ASTM D638 (type V) specifications and the modulus at 1% strain, yield stress, yield strain, stress at break, and strain at break were measured, see FIG. 22.

Additionally, PBI membranes made according to the current disclosure may be re-doped in phosphoric acid. These re-doped membranes may exhibit better creep resistance and have direct applicability at least in fuel cell applications.

Example 12: Dry Para-PBI Film Doped in 85 wt. % Phosphoric Acid para-PBI membrane made by the PPA process was first rinsed in a series of deionized water baths to remove phosphoric acid (PA), using pH indication paper to ensure all the acid had been removed before proceeding. The wet thickness was measured to be 356.67±5.8 μm, and membrane dimensions were cut to 45.72 cm×30.48 cm. The wet membrane was placed between two porous polyethylene sheets, clamped down around the perimeter to maintain the x-y dimensions and left to dry overnight. After 24 hours, the polyethylene sheets were removed, revealing a dried, dense PBI film. The film had a uniform thickness of 30 μm. The dry film was placed in 85 wt. % phosphoric acid for 24 hours before characterization and fuel cell tests. After PA doping, the membrane thickness was 150 μm.

Figure 24:
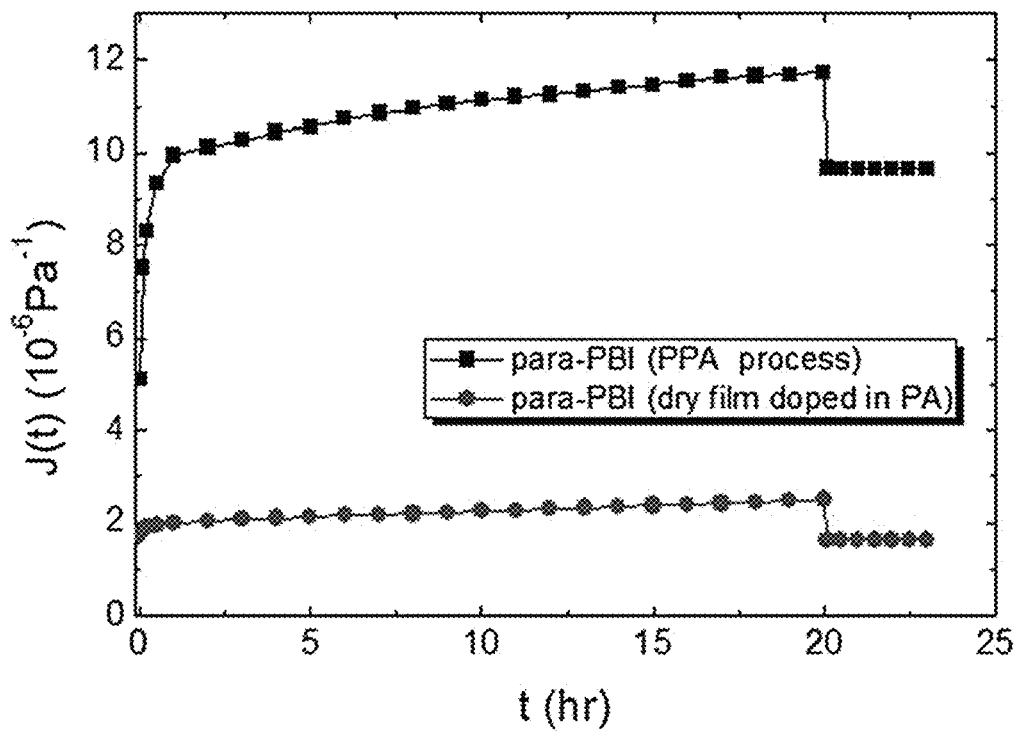
FIG. 24 shows that membranes made in the process disclosed herein displayed lower creep resistance than the standard PPA process membrane.

The compression creep and creep recovery tests were performed using a TA Instrument RSAIII Dynamic Mechanical Analyzer. Membrane samples were cut with a diameter of ~7 mm and thickness of approximately 1.2-1.7 mm. Prior to creep test, all the samples were preconditioned at 180° C. for 24 hours. In a typical experiment, a constant compressive force equivalent to a stress level of 0.1 MPa was applied to the sample and held for 20 hours, followed by removal of this force for 3 hours. All experiments were conducted at 180° C. and the strain and stress were recorded as a function of time. The creep compliance was calculated by dividing the time-dependent strain with the applied stress. In this work, the creep test was repeated 3 times for each membrane. In one embodiment, a film of the present disclosure may have a stress at break of at least 25 MPa. FIG. 24 shows that the membrane made in the current process displayed a much better (lower) creep resistance than the standard PPA process membrane.

Figure 25:
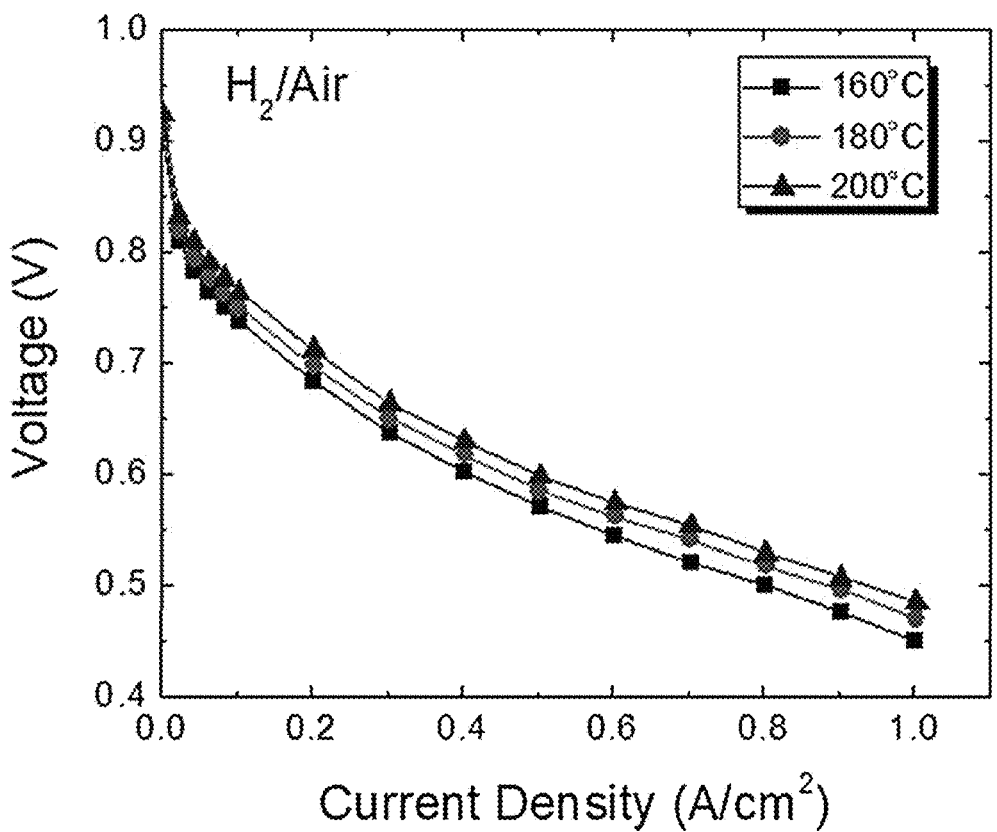
FIG. 25 shows a polarization curve for a membrane electrode assembly in $H_2$/air.
Figure 26:
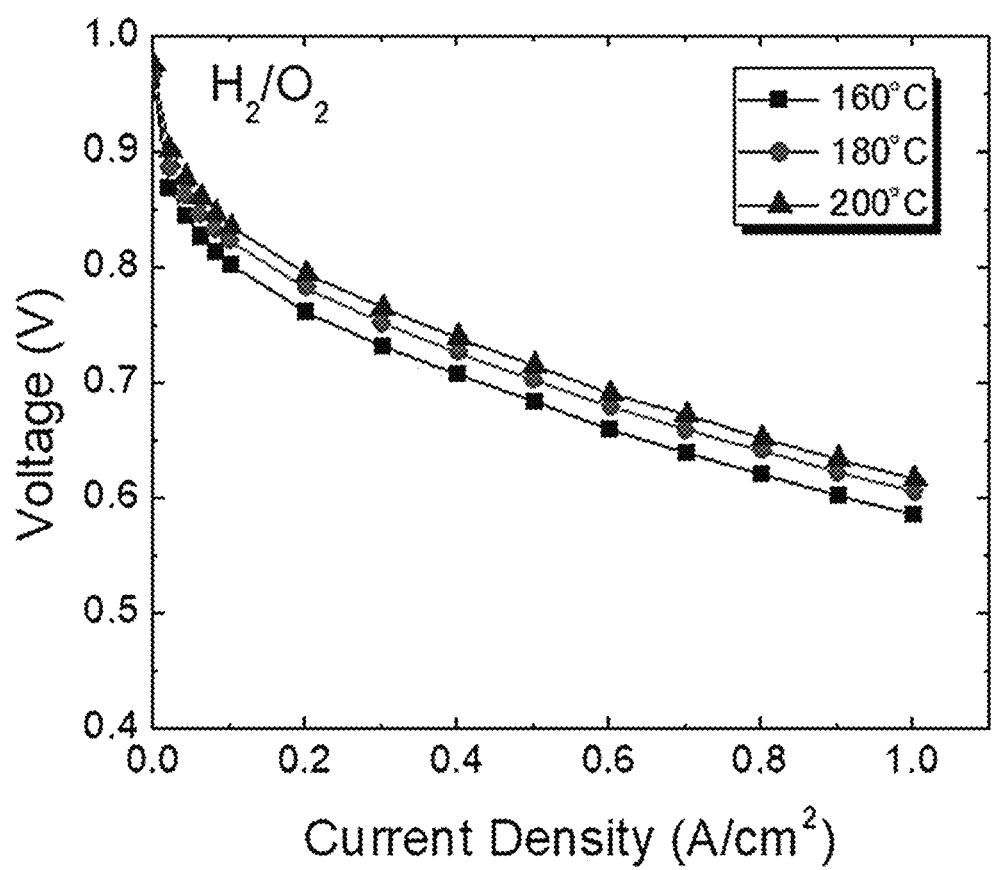
FIG. 26 shows a polarization curve for a membrane electrode assembly in $H_2/O_2$.

Membrane electrode assembly (MEA) consisted of phosphoric acid doped para-PBI membrane was assembled into a 10 cm² single cell hardware and tested using a commercial fuel cell testing station (Fuel Cell Technology, Inc.). The instrument was controlled by home programmed LabView software (National Instruments in Austin, Tex.). Before testing, a break-in of at least 24 hours was done by operating the cell at 160° C. and 0.2 A/cm² current density with $H_2$ supplied to the anode and air applied to the cathode. Polarization curves were recorded at 160, 180, and 200° C. with $H_2$/air=1.2/2.0 stoichiometric flows and $H_2/O_2$=1.2/2.0 stoichiometric flows. FIG. 25 shows a polarization curve in $H_2$/air and FIG. 26 shows a polarization curve in $H_2/O_2$.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art using the teachings disclosed herein.

What is claimed is:

1. A dried polybenzimidazole (PBI) film exhibiting a tensile stress at break of at least 25 MPa and a $VOSO_4$ permeability of from $2.6 \times 10^{-9}$ cm²/s to $4.89 \times 10^{-7}$ cm²/s, wherein the dried PBI film includes a crosslinked polybenzimidazole that includes one or more of the following repeating units:

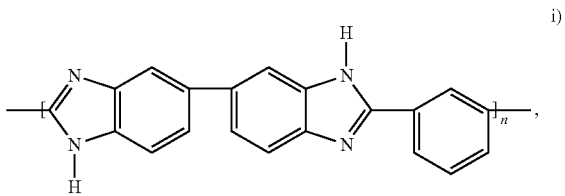

ii)
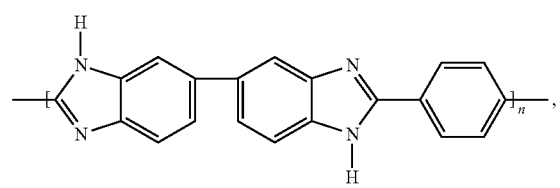
iii)
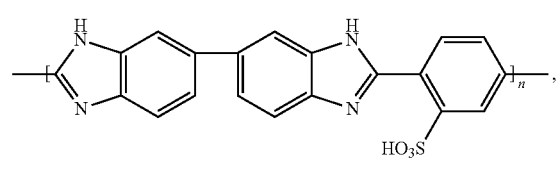
iv)
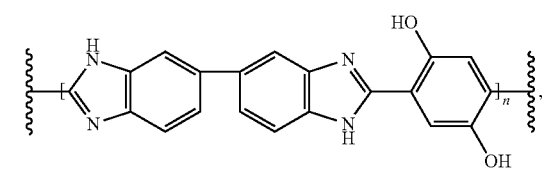
v)
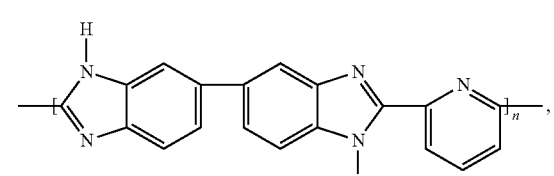
vi)
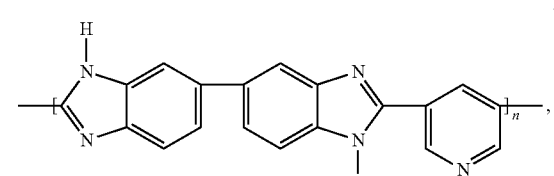
vii)
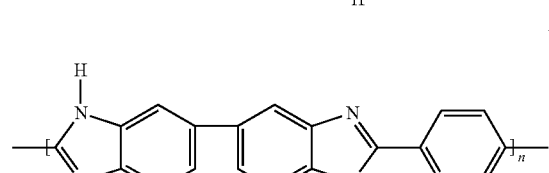
viii)
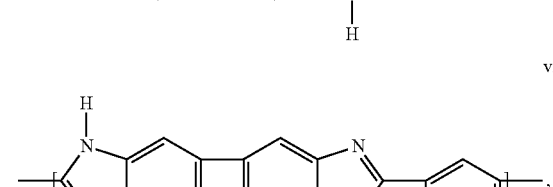
ix)
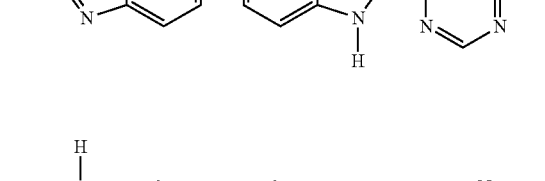
x)
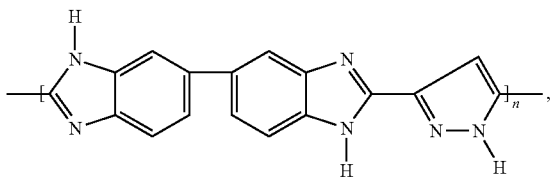
xi)
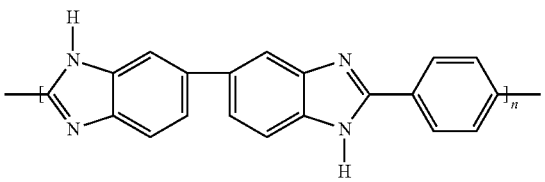
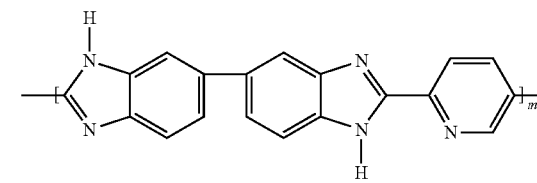
xii)
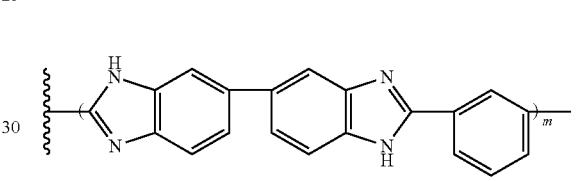
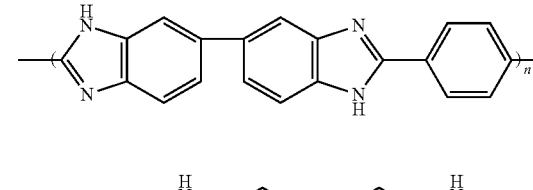
xiii)
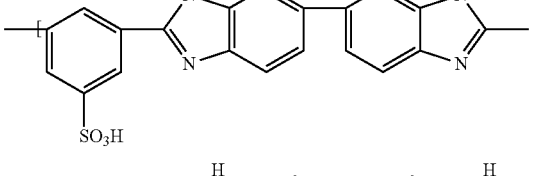
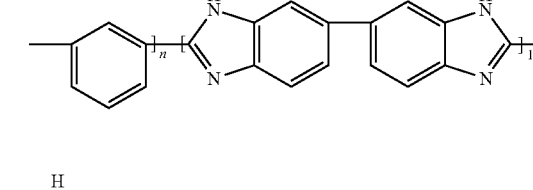
xiv)
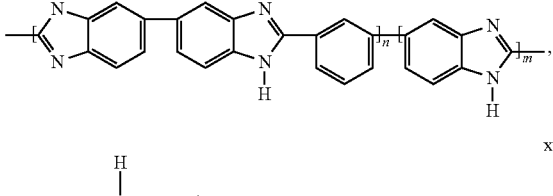
xv)
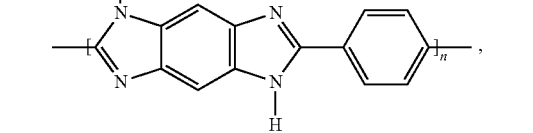

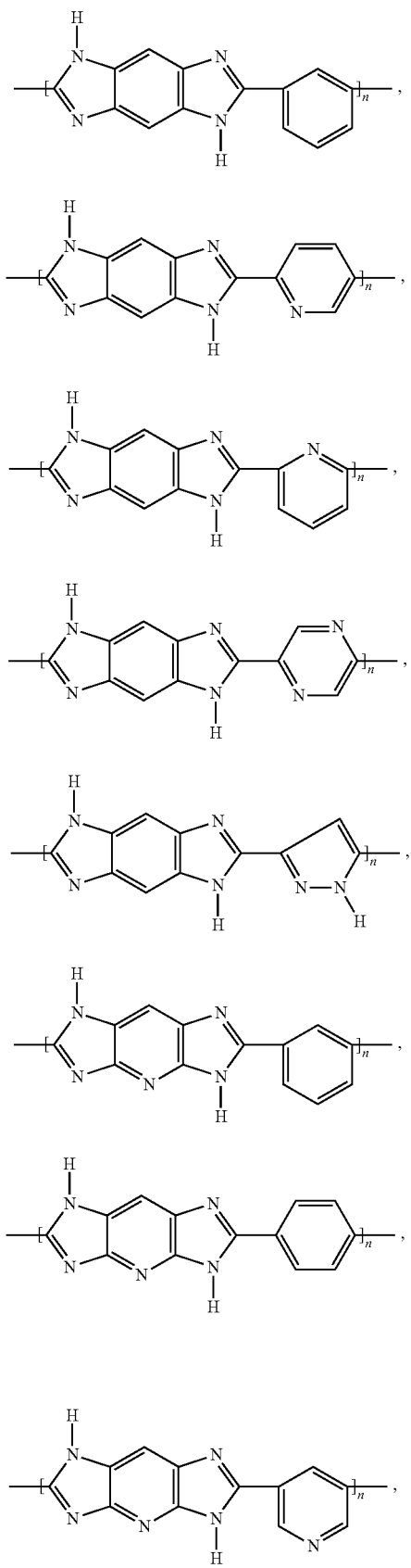
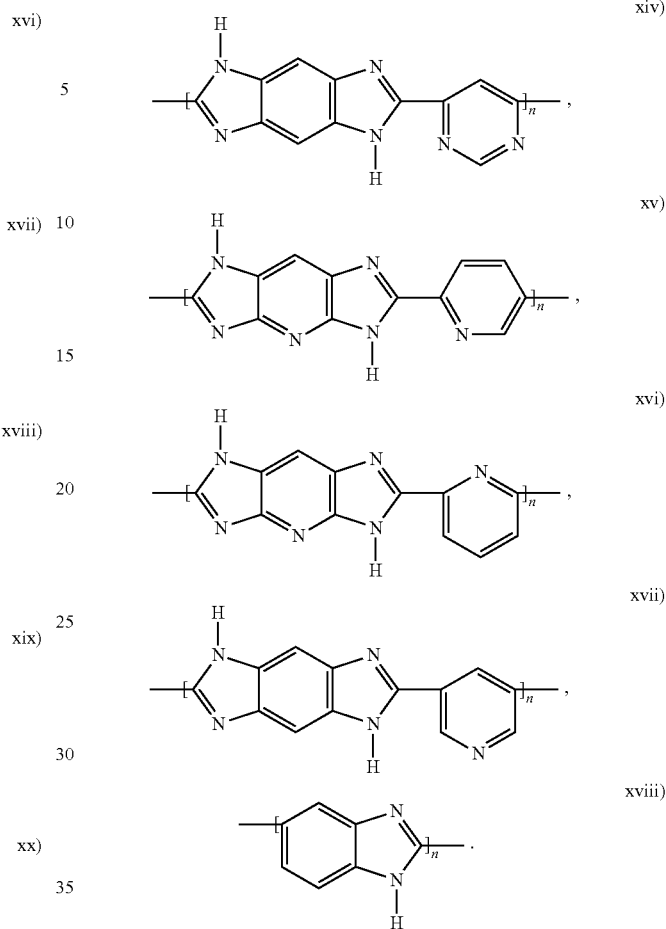

2. A process for forming the polybenzimidazole (PBI) film of claim 1 comprising:
   polymerizing an aromatic or heteroaromatic tetraamino compound with at least one aromatic or heteroaromatic polycarboxylic acid or ester, anhydride, or acid chloride thereof or at least one aromatic or heteroaromatic diaminocarboxylic acid in the presence of a polyphosphoric acid solvent to form a PBI polymer solution that includes the PBI polymer in solution with the polyphosphoric acid solvent;
   processing the PBI polymer solution to form a membrane precursor;
   hydrolyzing at least a portion of the polyphosphoric acid to form phosphoric acid and water, thereby causing a sol-gel transfer of the PBI polymer solution and solidification of the PBI polymer to form a PBI gel membrane;
   rinsing the PBI gel membrane and thereby removing the phosphoric acid from the gel membrane;
   drying the rinsed PBI gel membrane as it is restrained on a porous substrate and thereby forming the PBI film.

3. The process of claim 2, wherein the PBI gel membrane is rinsed in a series of washes.

4. The process of claim 2, wherein the rinsed PBI gel membrane is dried as it is restrained between the porous substrate and a second substrate.

5. The process of claim 2, wherein the second substrate is porous.

6. The process of claim 2, wherein the process is a continuous process.

7. The process of claim 2, further comprising imbibing the PBI file with an electrolyte.

8. The process of claim 7, wherein the electrolyte comprises sulfuric acid.

9. The process of claim 2, wherein the polymerization is carried out at a temperature of about 220° C. or less.

10. The process of claim 2, wherein the PBI polymer solution exhibits an intrinsic viscosity of about 0.8 dL/g or greater.

11. A redox flow battery including the PBI film of claim 1 imbibed with a supporting electrolyte.

12. The Redox flow battery of claim 11, the supporting electrolyte comprising sulfuric acid.

13. The Redox flow batter of claim 11, wherein the supporting electrolyte is present in a concentration of from 0.1 M to 25 M.

14. The redox flow battery of claim 11, wherein the redox flow battery is a vanadium redox flow battery.

15. The redox flow battery of claim 11, wherein the PBI film exhibits over 98% Coulombic efficiency under a cell cycling current density of from 100 mA/cm$^2$ to 450 mA/cm$^2$.

* * * * *